United States Patent
Buckley et al.

(10) Patent No.: US 10,925,068 B2
(45) Date of Patent: *Feb. 16, 2021

(54) SYSTEM AND METHOD FOR SUPPORTING GAN SERVICE REQUEST CAPABILITY IN A WIRELESS USER EQUIPMENT (UE) DEVICE

(71) Applicant: BlackBerry Limited, Waterloo (CA)

(72) Inventors: Adrian Buckley, Tracy, CA (US); George Baldwin Bumiller, Ramsey, NJ (US); Paul Marcus Carpenter, Twickenham (GB)

(73) Assignee: BlackBerry Limited, Waterloo (CA)

( * ) Notice: Subject to any disclaimer, the term of this patent is extended or adjusted under 35 U.S.C. 154(b) by 52 days.

This patent is subject to a terminal disclaimer.

(21) Appl. No.: 16/374,572

(22) Filed: Apr. 3, 2019

(65) Prior Publication Data
US 2019/0230669 A1 Jul. 25, 2019

Related U.S. Application Data

(63) Continuation of application No. 15/131,827, filed on Apr. 18, 2016, now Pat. No. 10,278,187, which is a
(Continued)

(51) Int. Cl.
*H04W 4/00* (2018.01)
*H04W 72/04* (2009.01)
(Continued)

(52) U.S. Cl.
CPC ..... *H04W 72/0493* (2013.01); *H04L 61/1511* (2013.01); *H04W 48/16* (2013.01);
(Continued)

(58) Field of Classification Search
CPC . H04W 72/0493; H04W 76/11; H04W 48/16; H04W 4/14; H04W 24/00;
(Continued)

(56) References Cited

U.S. PATENT DOCUMENTS

| | | | |
|---|---|---|---|
| 5,903,832 | A | 5/1999 | Seppanen |
| 5,978,673 | A | 11/1999 | Alperovich et al. |

(Continued)

FOREIGN PATENT DOCUMENTS

| | | |
|---|---|---|
| CA | 1279865 | 1/2001 |
| CA | 2503550 | 5/2004 |

(Continued)

OTHER PUBLICATIONS

International Search Report and Written Opinion of the International Searching Authority; PCT Office; dated Jan. 21, 2008; 10 pages.

(Continued)

*Primary Examiner* — Stephen M D Agosta
(74) *Attorney, Agent, or Firm* — Fish & Richardson P.C.

(57) ABSTRACT

In one embodiment, a scheme is disclosed for supporting wireless access network service request capability in a user equipment (UE) device that is operable in wide area cellular network (WACN) bands as well as in wireless access network bands (e.g., GAN bands and/or UMA bands). The UE device includes capability for gaining Internet Protocol (IP) connectivity with a wireless access network node (e.g., a GAN controller (GANC) or UMA network controller (UNC)). Thereafter, the UE device is operable to initiate a registration request message towards the wireless access network node, wherein the registration request message includes at least one information element pertaining to wireless access network services required by the UE device.

20 Claims, 13 Drawing Sheets

Related U.S. Application Data continuation of application No. 11/287,637, filed on Nov. 28, 2005, now Pat. No. 9,319,973.

(60) Provisional application No. 60/631,457, filed on Nov. 29, 2004.

(51) Int. Cl.

| | | |
|---|---|---|
| *H04W 48/16* | (2009.01) | |
| *H04W 48/18* | (2009.01) | |
| *H04W 76/11* | (2018.01) | |
| *H04L 29/12* | (2006.01) | |
| *H04W 4/14* | (2009.01) | |
| *H04W 24/00* | (2009.01) | |
| *H04W 28/18* | (2009.01) | |
| *H04W 36/00* | (2009.01) | |
| *H04W 36/14* | (2009.01) | |
| *H04W 48/08* | (2009.01) | |
| *H04W 84/04* | (2009.01) | |
| *H04W 88/06* | (2009.01) | |
| *H04W 88/12* | (2009.01) | |
| *H04W 92/02* | (2009.01) | |
| *H04W 92/06* | (2009.01) | |

(52) U.S. Cl.
CPC ............ *H04W 48/18* (2013.01); *H04W 76/11* (2018.02); *H04W 4/14* (2013.01); *H04W 24/00* (2013.01); *H04W 28/18* (2013.01); *H04W 36/0083* (2013.01); *H04W 36/14* (2013.01); *H04W 48/08* (2013.01); *H04W 84/042* (2013.01); *H04W 88/06* (2013.01); *H04W 88/12* (2013.01); *H04W 92/02* (2013.01); *H04W 92/06* (2013.01)

(58) Field of Classification Search
CPC . H04W 28/18; H04W 36/0083; H04W 36/14; H04W 48/08; H04W 84/042; H04W 88/06; H04W 88/12; H04W 92/02; H04W 92/06; H04L 61/1511
See application file for complete search history.

(56) References Cited

U.S. PATENT DOCUMENTS

| | | | |
|---|---|---|---|
| 6,101,387 A | 8/2000 | Granberg | |
| H001918 H * | 11/2000 | Hoffpauir | 379/242 |
| 6,356,761 B1 | 3/2002 | Huttunen | |
| 6,389,283 B1 | 5/2002 | Herroro | |
| 6,799,038 B2 | 9/2004 | Gopikanth | |
| 6,909,705 B1 | 6/2005 | Lee et al. | |
| 6,938,155 B2 | 8/2005 | Fiveash et al. | |
| 6,947,405 B2 | 9/2005 | Pitcher et al. | |
| 7,096,014 B2 | 8/2006 | Haverinen et al. | |
| 7,489,919 B2 | 2/2009 | Cheng | |
| 7,852,817 B2 * | 12/2010 | Gallagher | H04W 8/04 370/338 |
| 8,064,907 B2 * | 11/2011 | Gallagher | H04W 8/08 455/435.1 |
| 8,073,428 B2 * | 12/2011 | Khetawat | H04W 16/16 455/411 |
| 8,335,507 B1 | 12/2012 | Mangal | |
| 2002/0087674 A1 | 7/2002 | Guilford et al. | |
| 2002/0133534 A1 | 9/2002 | Forslow | |
| 2002/0164984 A1 | 11/2002 | Thakker | |
| 2002/0176579 A1 | 11/2002 | Deshpande et al. | |
| 2002/0178355 A1 | 11/2002 | D'Sa et al. | |
| 2003/0119481 A1 | 6/2003 | Haverinen et al. | |
| 2003/0172163 A1 | 9/2003 | Fujita et al. | |
| 2004/0066756 A1 | 4/2004 | Ahmavaara | |
| 2004/0087307 A1 | 5/2004 | Ibe et al. | |
| 2004/0116119 A1 | 6/2004 | Lewis | |
| 2004/0116120 A1 * | 6/2004 | Gallagher | H04W 60/04 455/436 |
| 2004/0151136 A1 | 8/2004 | Gage | |
| 2004/0218605 A1 | 11/2004 | Gustafsson et al. | |
| 2004/0230697 A1 | 11/2004 | Kiss | |
| 2004/0266436 A1 | 12/2004 | Jaakkola | |
| 2005/0041578 A1 | 2/2005 | Huotari et al. | |
| 2006/0077924 A1 | 4/2006 | Rune | |
| 2006/0077926 A1 | 4/2006 | Rune | |
| 2006/0079274 A1 | 4/2006 | Gallagher et al. | |
| 2006/0095954 A1 | 5/2006 | Buckley et al. | |
| 2006/0114871 A1 | 6/2006 | Buckley et al. | |
| 2006/0116125 A1 | 6/2006 | Buckley et al. | |
| 2006/0121935 A1 | 6/2006 | Dalsgaard | |
| 2006/0168648 A1 | 7/2006 | Vank | |
| 2007/0188298 A1 | 8/2007 | Tariq | |
| 2008/0039087 A1 | 2/2008 | Gallagher | |

FOREIGN PATENT DOCUMENTS

| | | |
|---|---|---|
| CA | 2504855 | 5/2004 |
| CA | 2515819 | 8/2004 |
| CA | 2491560 | 7/2005 |
| CN | 1435068 | 8/2003 |
| JP | 2000270360 | 3/1999 |
| JP | H11504184 | 4/1999 |
| JP | 2004522348 | 7/2004 |
| JP | 2004297357 | 10/2004 |
| JP | 2006505158 | 2/2006 |
| KR | 20070064323 | 6/2007 |
| KR | 20071086853 | 8/2007 |
| KR | 20070091176 | 9/2007 |
| KR | 20070086856 | 6/2008 |
| WO | 9634504 | 10/1996 |
| WO | 9916267 | 4/1999 |
| WO | 2000017769 | 3/2000 |
| WO | 0147316 | 6/2001 |
| WO | 0191382 | 11/2001 |
| WO | 2063900 | 8/2002 |
| WO | 02067563 | 8/2002 |
| WO | 02076133 | 9/2002 |
| WO | 02080607 | 10/2002 |
| WO | 2002078265 | 10/2002 |
| WO | 02091783 | 11/2002 |
| WO | 03058996 | 7/2003 |
| WO | 3107698 | 12/2003 |
| WO | 04017172 | 2/2004 |
| WO | 2004017172 | 2/2004 |
| WO | 2004036770 | 4/2004 |
| WO | 2004040931 | 5/2004 |
| WO | 04047476 | 6/2004 |
| WO | 2004073338 | 8/2004 |
| WO | 2004099919 | 11/2004 |
| WO | 2004100576 | 11/2004 |
| WO | 2004112346 | 12/2004 |
| WO | 2005060292 | 6/2005 |
| WO | 2005107169 | 11/2005 |
| WO | 2006053420 | 5/2006 |
| WO | 2006056069 | 6/2006 |
| WO | 2006056070 | 6/2006 |
| WO | 2006056071 | 6/2006 |

OTHER PUBLICATIONS

Laine et al.; "Network Models for Converged Fixed and Mobile Telephony"; Technical Paper; Alcatel; Apr. 2005; 8 pages.

"Unlicensed Mobile Access (UMA) Architecture (Stage 2)"; Technical Specification; Nov. 3, 2004; 79 Pages.

Search Report; European Patent Office; dated Jan. 8. 2008; 10 pages.

European Search Report; European Patent Office; dated Nov. 27, 2007; 5 pages.

International Search Report and Written Opinion of the International Searching Authority; PCT Office (PCT Patent Appln No. 2005/001795); 8 pages.

International Search Report and Written Opinion of the International Searching Authority; PCT Office (PCT Patent Appln No. 2005/001796); 9 pages.

(56) References Cited

OTHER PUBLICATIONS

IPA Examiner's First Report for Application No. 2005309290; Australian Government; dated Aug. 14, 2008; 2 pages.
Korean Office Action for Application No. 10-2007-1075064 with English Translation; Korean Intellectual Property Office; dated Sep. 23, 2008; 10 pages.
Korean Office Action for Application No. 10-2007-7015067 with English Translation; Korean Intellectual Property Office; dated Sep. 24, 2008; 10 pages.
Korean Office Action for Application No. 10-2007-7015060 with English Translation; Korean Intellectual Property Office; dated Sep. 19, 2008; 9 pages.
EPO Search Report for Application No. 05810584.2; European Patent Office; dated Oct. 6, 2008; 7 pages.
Unlicensed Mobile Access (UMA); Architecture (Stage 2); Technical Specification; Oct. 8, 2004; pp. 1-80.
Australian Examiner's First Report; Application No. 2005 309 288; IP Australia; dated Jul. 21, 2009; 12 pages.
Australian Examiner's First Report; Application No. 2005 309 289; IP Australia; dated Jul. 24, 2009; 8 pages.
Notice of Acceptance in Australian Application No. 2005 309 290; IP Australia; dated Aug. 18, 2009; 3 pages.
Japanese Office Action; Application No. 2007-541616; Japan Patent Law; dated Oct. 16, 2009; 7 pages.
Korean Notice Requesting Submission of Opinion (Preliminary Office Action); Application No. 10-2009-7017553; Korean IPO; dated Oct. 21, 2009; 12 pages.
Japanese Patent Office Notice of Reason for Rejection, Japanese Patent Application No. 2007-541615; dated Nov. 11, 2009; 4 pages.
Ericsson, et al, Proposal for Stage 2 description for Generic Access to A/Gb interface, 3GPP TSG Geran #22 Meeting, GP-042394, (Generic Access to the A/Gb interface; Stage 2 (Release X), 3GPP TS 43. xxx V0.2.0 (Oct. 2004)), Nov. 8, 2004, 22 pages.
Canadian Office Action; Application No. 2,589,222; Canadian Intellectual Property Office; dated Feb. 8, 2010, 2 pages.
Chinese Office Action; Application No. 200580040995.3; State Intellectual Property Office of People's Republic of China; dated Mar. 1, 2010; 5 pages.
Mexican Office Action; Application No. MX/a/2007/006406; Instituto Mexicano de la Propiedad Industrial; dated Mar. 2, 2010; 3 pages.
EPO Communication; Application No. 05 810 584.2; European Patent Office; dated Mar. 23, 2010; 2 pages.
Mexican Office Action; Application No. MX/a/2007/006342; Instituto Mexicano de la Propiedad Industrial; dated Jan. 28, 2010; 2 pages.
Global System for Mobile Communications, 3GPP TS 44.318 V6.30 (Nov. 2005 ), Generic Access (GA) to the A/Gb interface, Mobile GA interface layer 3 specification (Release 6); 2005; pp. 149.
Mexican Office Action; Application No. MX/a/2007/006406; Instituto Mexicano de la Propiedad Industrial; dated Jan. 28, 2010; 3 pages.
Japanese Office Action; Application No. 2007-541615; Japanese Patent Office, dated Apr. 15, 2010; 4 pgs.
Japanese Office Action, Application No. 2007-541616, Japan IPO, dated Aug. 13, 2010, 4 pgs.
Chinese office Action, Application No. 200580040809.6, State Intellectual Property Office of People's Republic of China, dated Jul. 14, 2010, 5 pgs.
U.S. Office Action, U.S. Appl. No. 11/264,548, USPTO, dated Mar. 21, 2008, 9 pgs.
U.S. Office Action, U.S. Appl. No. 11/264,548, USPTO, dated Sep. 30, 2008, 10 pgs.
U.S. Office Action, U.S. Appl. No. 11/264,548, US PTO, dated May 18, 2009, 10 pgs.
U.S. Office Action, U.S. Appl. No. 11/264,548, USPTO, dated Nov. 18, 2009, 10 pgs.
U.S. Office Action, U.S. Appl. No. 11/264,548, USPTO, dated Feb. 18, 2010, 11 pgs.
U.S. Office Action, U.S. Appl. No. 11/264,548, USPTO, dated Oct. 20, 2010, 10 pgs.

Australian Examination Report, Application No. 2005306523, Australian IPO, dated Jun. 26, 2009, 2 pgs.
Australian Examination Report, Application No. 2005309288, Australian IPO, dated May 4, 2010, 1 pg.
Australian Examination Report, Application No. 2005309288, Australian IPO, dated Jul. 21, 2009, 12 pgs.
Australian Examination Report, Application No. 2005309289, Australian IPO, dated Apr. 28, 2010, 2 pgs.
Australian Examination Report, Application No. 2005309290, Australian IPO, dated Aug. 14, 2008, 2 pgs.
Australian Examination Report, Application No. 2010200681, Australian IPO, dated Oct. 28, 2010, 2 pgs.
Australian Notice of Acceptance, Application No. 2005306523, Australian IPO, dated Mar. 30, 2010, 3 pgs.
Australian Notice of Acceptance, Application No. 2005309288, Australian IPO, dated May 20, 2010, 3 pgs.
Australian Notice of Acceptance, Application No. 2005309289, Australian IPO, dated May 21, 2010, 3 pgs.
Chinese Office Action, Application No. 200580034485.5, Chinese IPO, dated Jun. 19, 2009, 4pgs.
Chinese Office Action, Application No. 200580034485.5, Chinese IPO, dated Dec. 7, 2010, 4 pgs.
Chinese Office Action, Application No. 200580040809.6, Chinese IPO, dated Jul. 14, 2010, 5 pgs.
Chinese Office Action, Application No. 200580040994.9, Chinese IPO, dated Oct. 23, 2009, 8 pgs.
Chinese Office Action, Application No. 200580040994.9, Chinese IPO, dated May 23, 2011, 6 pgs.
Chinese Office Action, Application No. 201002002645.5, Chinese IPO, dated Dec. 7, 2010, 4 pgs.
European Examination Report, Application No. 05 8105 82.6, European Patent Office, dated Feb. 21, 2008, 2 pgs.
European Examination Report, Application No. 05810582.6, European Patent Office, dated Nov. 27, 2008, 4 pgs.
European Examination Report, Application No. 05810582.6, European Patent Office, dated Oct. 5, 2009, 4 pgs.
European Minutes of Oral Proceedings, Application No. 05810582.6, European Patent Office, Mar. 16, 2011, 14 pgs.
European Examination Report, Application No. 05810584.2, European Patent Office, dated Feb. 20, 2009, 1 pg.
European Examination Report, Application No. 05810584.2, European Patent Office, dated Mar. 23, 2010, 2 pgs.
European Examination Report, Application No. 05810781.4, European Patent Office, dated Mar. 20, 2008, 1 pg.
European Examination Report, Application No. 05810781.4, European Patent Office, dated Oct. 22, 2010, 2 pgs.
European Examination Report, Application No. 05850122.2, European Patent Office, dated Dec. 20, 2007, 1 pg.
European Examination Report, Application No. 05850122.2, European Patent Office, dated Jul. 21, 2008, 1 pg.
European Examination Report, Application No. 05850122.2, European Patent Office, dated May 20, 2009, 4 pgs.
European Examination Report, Application No. 05850122.2, European Patent Office, dated Oct. 5, 2010, 8 pgs.
European Notice of Publication, Application No. 05810582.6, European Patent Office, dated Jul. 18, 2007, 1 pg.
European Extended Search Report, Application No. 05810582.6, European Patent Office, dated Nov. 27, 2007, 5 pgs.
European Extended Search Report, Application No. 05810584.2, European Patent Office, dated Oct. 6, 2008, 6 pgs.
European Search Report, Application No. 05850122.2, European Patent Office, dated Oct. 10, 2007, 9 pgs.
Indian Office Action, Application No. 2040/CHEN/2007, Indian IPO, dated Feb. 7, 2011, 2 pgs.
Japanese Office Action, Application No. 2007541614, Japanese IPO, dated May 16, 2011, 3 pgs.
Japanese Office Action, Application No. 2007541615, Japanese IPO, dated Nov. 19, 2009, 4 pgs.
Japanese Office Action, Application No. 2007541615, Japanese IPO, dated Apr. 15, 2010, 4 pgs.
Korean Office Action, Application No. 10-2007-7005920, Korean IPO, dated Apr. 28, 2008, 5 pgs.

(56) References Cited

OTHER PUBLICATIONS

Korean Notice of Decision for Patent, Application No. 10-2007-7005920, Korean IPO, dated Nov. 24, 2008, 1 pg.
Korean Office Action, Application No. 10-2007-7015064, Korean IPO, dated Sep. 23, 2008, 5 pgs.
Korean Office Action, Application No. 10-2007-7015064, Korean IPO, dated Apr. 21, 2009, 2 pgs.
Korean Notice of Decision for Final Rejection, Application No. 10-2007-7015060, Korean IPO, dated May 19, 2009, 6 pgs.
Korean Office Action, Application No. 10-2007-7015067, Korean IPO, dated Sep. 24, 2008, 5 pgs.
Korean Notice of Decision for Final Rejection, Application No. 10-2007-7015067, Korean IPO, dated Apr. 21, 2009, 2 pgs.
Korean Office Action, Application No. 10-2009-7017552, Korean IPO, dated Dec. 8, 2009, 6 pgs.
Mexican Office Action, Application No. MX/a/2007/006342, Mexican IPO, dated Jan. 28, 2010, 2 pgs.
Mexican Office Action, Application No. MX/a/2007/006406, Mexican IPO, dated Jan. 28, 2010, 3 pgs.
PCT Preliminary Report with Written Opinion, Application No. PCT/CA2005/001797, European Patent Office, dated Jun. 7, 2007, 8 pgs.
PCT Search Report with Written Opinion, Application No. PCT/CA2005/001665, European Patent Office, dated Feb. 9, 2006, 4 pgs.
PCT Search Report with Written Opinion, Application No. PCT/CA2005/001795, European Patent Office, dated Feb. 22, 2006, 11 pgs.
PCT Search Report with Written Opinion, Application No. PCT/CA2005/001797, European Patent Office, dated Feb. 22, 2006, 13 pgs.
U.S. Office Action, U.S. Appl. No. 11/287,638, USPTO, dated Jun. 3, 2008, 11 pgs.
U.S. Office Action, U.S. Appl. No. 11/287,638, USPTO, dated Oct. 20, 2008, 12 pgs.
U.S. Office Action, U.S. Appl. No. 11/287,638, USPTO, dated Apr. 20, 2009, 11 pgs.
U.S. Office Action, U.S. Appl. No. 11/287,638, USPTO, dated Sep. 1, 2009, 10 pgs.
U.S. Office Action, U.S. Appl. No. 11/287,638, USPTO, dated Jan. 13, 2010, 9 pgs.
U.S. Office Action, U.S. Appl. No. 11/287,638, USPTO, dated May 10, 2010, 6 pgs.
U.S. Office Action, U.S. Appl. No. 11/287,857, USPTO, dated Jul. 29, 2008, 11 pgs.
U.S. Office Action, U.S. Appl. No. 11/287,857, USPTO, dated Dec. 23, 2008, 10 pgs.
U.S. Office Action, U.S. Appl. No. 11/287,857, USPTO, dated Jun. 19, 2009, 12 pgs.
U.S. Office Action, U.S. Appl. No. 11/287,857, USPTO, dated Jan. 21, 2010, 10 pgs.
U.S. Office Action, U.S. Appl. No. 11/287,857, USPTO, dated Mar. 23, 2011, 10 pgs.
3rd Generation Partnership Project Technical Specification Group Core Network 3GPP System to Wireless Local Area Network (WLAN) Interworking, TS 24.234 V6.0.0, Sep. 2004, 24 pgs.
3rd Generation Partnership Project Technical Specification Group Core Network Numbering, Addressing and Identification, TS 23.003 V6.4.0, Sep. 2004, 44 pgs.
3rd Generation Partnership Project Technical Specification Group GERAN Feasibility Study on Generic Access to A/Gb Interface, Release 6, TR 43.901 V2.1.0, Aug. 2004, 35 pgs.
CIPO, Office Action, Application No. 2,589,222, dated Jul. 26, 2011, 3 pgs.
EPO, Communication Pursuant to Article 94(3) EPC, Application No. 05810781.4, dated Jul. 6, 2011, 5 pgs.
SIPO, Detailed Second Office Action, Application No. 2005-80040995.3, dated Jun. 30, 2011, 9 pgs.
EPO, Communication Pursuant to Article 94.3 EPC, Application No. 05810584.2, dated Jul. 22, 2011, 4 pgs.
EPO, Decision to Grant, Application No. 058105826, dated Sep. 8, 2011, 1 pg.
IP India, First Examination Report, Application No. 3963/DELNA/2007, dated Aug. 1, 2011, 2 pgs.
SIPO, Third Office Action, Application No. 200580034485.5, dated Jul. 13, 2011, 5 pgs.
CIPO, Office Action, Application No. 2,589,215, dated Dec. 13, 2011, 3 pgs.
IP India, First Examination Report, Application No. 2896/RQ-DEL/2007, dated Oct. 22, 2011, 2 pgs.
USPTO, Examiner's Answer, U.S. Appl. No. 11/287,857, dated Jan. 9, 2012, 25 pgs.
EPO, Communication Under Rule 71 (3) EPC, Application No. 05810781.4, dated Dec. 19, 2011, 6 pgs.
IP India, Second Office Action, Application No. 2040/CHENP/2007, dated Dec. 15, 2011, 2 pgs.
CIPO, Office Action, Application No. 2,575,660, dated Feb. 27, 2012, 2 pgs.
EPO, Communication Pursuant to Article 94(3) EPC, Application No. 05850122.2, dated Apr. 4, 2012, 6 pgs.
In IP, Hearing Notice, Application No. 2040/CHENP/2007, Feb. 14, 2012, 3 pgs.
SIPO, Office Action, Application No. 200580040809.6, dated Mar. 7, 2012, 3 pgs.
SIPO, Office Action, Application No. 200580040995.3, dated Feb. 22, 2012, 3 pgs.
CIPO, Office Action, Application No. 2,589,228, dated Jun. 1, 2011, 4 pgs.
SIPO, Second Office Action, Application No. 200580040809.6, dated May 5, 2011, 2 pgs.
USPTO, Office Action, U.S. Appl. No. 11/287,857, dated Jul. 5, 2011, 17 pgs.
EPO, Decision to Grant, Application No. 05810781.4, dated May 7, 2012, 1 pg.
SIPO, Reexamination Decision, Application No. 200580040994.9, dated Jul. 2, 2012, 5 pgs.
USPTO, Office Action, U.S. Appl. No. 11/287,857, dated Aug. 2, 2012, 22 pgs.
Office Action issued in U.S. Appl. No. 15/131,827 dated Sep. 27, 2017; 32 pages.
United States Office Action in U.S. Appl. No. 15/131,827 dated Feb. 7, 2018, 22 pages.
Advisory Action issued in U.S. Appl. No. 15/131,827 dated Apr. 30, 2018.
Non-Final Office Action issued in U.S. Appl. No. 15/131,827, dated Jul. 9, 2018, 23 pages.
Notice of Allowance issued in U.S. Appl. No. 15/131,827 dated Dec. 28, 2018.

\* cited by examiner

US 10,925,068 B2

SYSTEM AND METHOD FOR SUPPORTING GAN SERVICE REQUEST CAPABILITY IN A WIRELESS USER EQUIPMENT (UE) DEVICE

PRIORITY UNDER 35 U.S.C. § 119(e) & 37 C.F.R. § 1.78

This nonprovisional patent application is a continuation of and claims priority to U.S. application Ser. No. 15/131,827, filed Apr. 18, 2016, which is a continuation of and claims priority to U.S. application Ser. No. 11/287,637, filed Nov. 28, 2005, which claims priority based upon the following prior U.S. provisional patent application: "SYSTEM AND METHOD OF NETWORK SELECTION," Application No. 60/631,457, filed Nov. 29, 2004, in the name(s) of Adrian Buckley, George Baldwin Bumiller and Paul Carpenter, which are hereby incorporated by reference.

CROSS-REFERENCE TO RELATED APPLICATION(S)

This application discloses subject matter that is related to the subject matter of the following U.S. patent application(s): (i) "NETWORK SELECTION INVOLVING GANC REDIRECTION", U.S. application Ser. No. 11/287,638, filed even date herewith; and (ii) "SYSTEM AND METHOD FOR PROVIDING OPERATOR-DIFFERENTIATED MESSAGING TO A WIRELESS USER EQUIPMENT (UE) DEVICE", U.S. application Ser. No. 11/287,857, filed even date herewith, which is (are) hereby incorporated by reference.

FIELD OF THE DISCLOSURE

The present patent disclosure generally relates to communication networks. More particularly, and not by way of any limitation, the present patent application is directed to a system and method for supporting wireless access network (AN) service request capability in a user equipment (UE) device operable in a wireless AN space that may be interconnected to a wide area cellular network (WACN) space.

BACKGROUND

Wireless access networks have become a key element of a variety of telecommunications network environments. As to enterprise networks, they provide convenient access to network resources for workers carrying portable computers and mobile handheld devices, and for guests or temporary workers similarly equipped. They also provide a cost-effective alternative to relocating physical Ethernet jacks in environments where facilities are moved or changed frequently. In addition, wireless access points operable with diverse communication/computing devices are becoming ubiquitous in public environments such as, e.g., hotels, airports, restaurants, and coffee shops. With the increase in high-speed Internet access, the use of access point(s) in the users' homes is also envisioned and has started for other applications.

Concomitantly, several developments in the user equipment (UE) arena are also taking place to take advantage of the capabilities offered by wireless access networks. Of particular interest is the integration of cellular phones with the capability to interface with a wireless access network such as a wireless Local Area Network (WLAN). With such "dual mode" devices becoming available, it should be appreciated that some interworking mechanism between the cellular network and WLAN would be required so as to facilitate efficient handover of services from one type of network to the other.

Current GAN specifications provide that a UE device (e.g., a mobile station or MS) may register on a wide area cellular network (WACN) such as a Public Land Mobile Network (PLMN) if it is discovered and allowed according to applicable 3rd Generation Partnership Project (3GPP) standards. Also, the UE device may be allowed to register on a GAN under certain circumstances where there is no WACN connectivity. Additionally, similar network connectivity behavior may be encountered where Unlicensed Mobile Access (UMA) technologies are deployed as well. However, several important issues arise in such a scenario e.g., number plan compatibility, service handover, emergency call routing, just to name a few, especially when connectivity to a PLMN is desired via a GAN or UMA-based access network.

BRIEF DESCRIPTION OF THE DRAWINGS

A more complete understanding of the embodiments of the present patent application may be had by reference to the following Detailed Description when taken in conjunction with the accompanying drawings wherein.

DETAILED DESCRIPTION OF THE DRAWINGS

The present patent disclosure is broadly directed to a scheme for supporting wireless access network service request capability in a user equipment (UE) device that is operable in WACN bands as well as in wireless access network bands (e.g., GAN bands and/or UMA bands). The UE device includes capability for gaining Internet Protocol (IP) connectivity with a wireless access network node (e.g., a GAN controller (GANC) or UMA network controller (UNC)). Thereafter, the UE device is operable to initiate a registration request message towards the wireless access network node, wherein the registration request message includes at least one information element pertaining to wireless access network services required by the UE device.

In one aspect, an embodiment of a network messaging method is disclosed which comprises: gaining IP connectivity by a UE device with respect to a wireless access network node disposed in a network environment that is comprised of a wireless access network (AN) space operable to be coupled to a WACN space; and initiating a registration request message by the UE device towards the wireless access network node, wherein the registration request message includes at least one information element pertaining to AN services required by the UE device.

In a further aspect, an embodiment of a UE device is disclosed which comprises: means for gaining IP connectivity with respect to a wireless access network node disposed in a network environment that is comprised of a wireless AN space operable to be coupled to a WACN space; and means for initiating a registration request message towards the wireless access network node, wherein the registration request message includes at least one information element pertaining to AN services required by the UE device.

In yet another aspect, an embodiment of a network system is disclosed which comprises: a wireless access network node disposed in a network environment that is comprised of a wireless access network (AN) space operable to be coupled to a WACN space, the wireless access network node for facilitating wireless access services with respect to a Public Land Mobile Network (PLMN) of the WACN space; a UE device including means for gaining IP connectivity with the wireless access network node; and means associated with the UE device for initiating a registration request message towards the wireless access network node, wherein the registration request message includes at least one information element pertaining to wireless access services required by the UE device.

Figure 1:
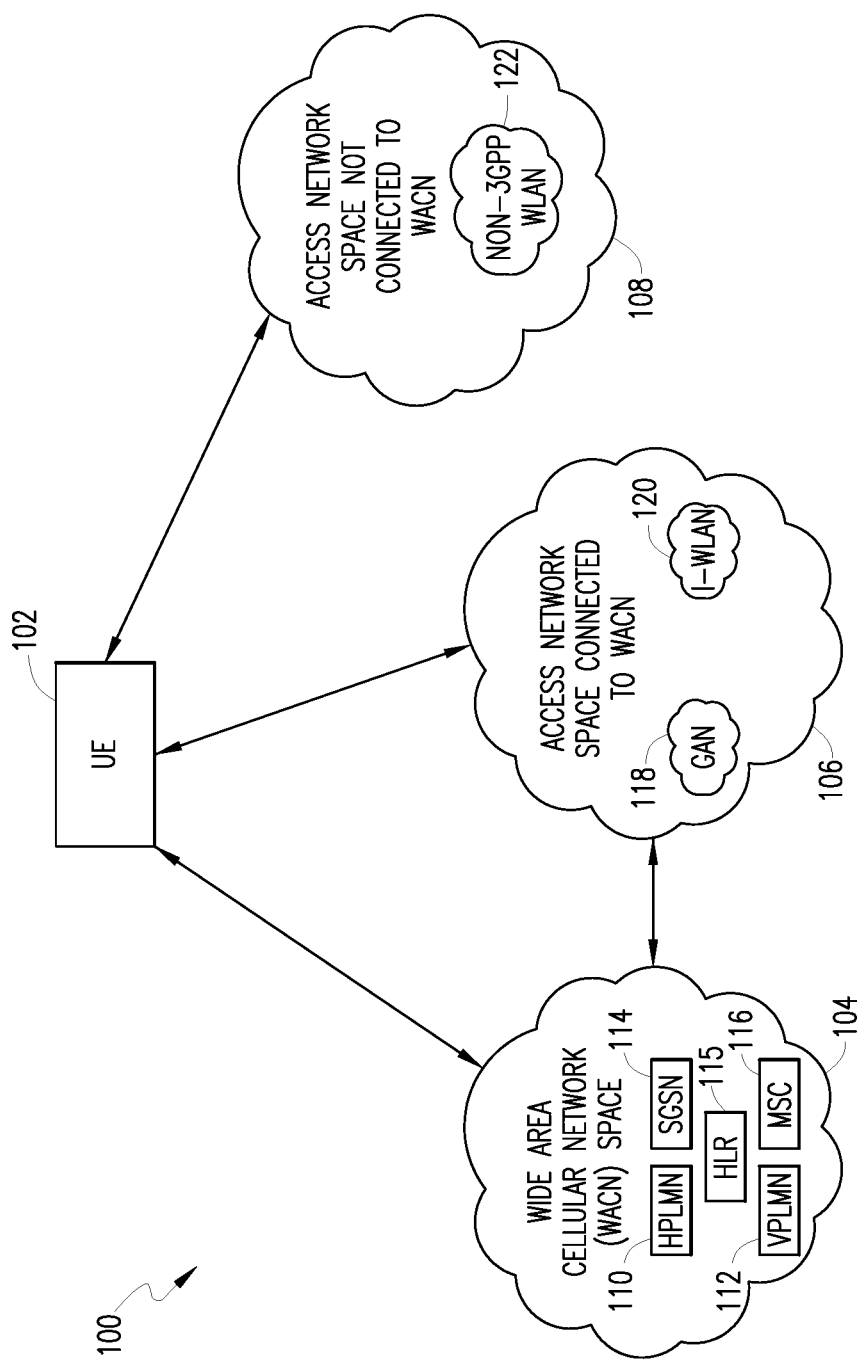
FIG. 1 depicts a generalized network environment wherein an embodiment of the present patent disclosure may be practiced.

A system and method of the present patent disclosure will now be described with reference to various examples of how the embodiments can best be made and used. Like reference numerals are used throughout the description and several views of the drawings to indicate like or corresponding parts, wherein the various elements are not necessarily drawn to scale. Referring now to the drawings, and more particularly to FIG. 1, depicted therein is an exemplary generalized network environment 100 wherein an embodiment of the present patent disclosure may be practiced. A user equipment (UE) device 102 may comprise any portable computer (e.g., laptops, palmtops, or handheld computing devices) or a mobile communications device (e.g., cellular phones or data-enabled handheld devices capable of receiving and sending messages, web browsing, et cetera), or any enhanced personal digital assistant (PDA) device or integrated information appliance capable of email, video mail, Internet access, corporate data access, messaging, calendaring and scheduling, information management, and the like, that is preferably operable in one or more modes of operation. For example, UE device 102 may operate in the cellular telephony band frequencies as well as wireless Local Area Network (WLAN) bands, or possibly in the WLAN bands alone. Further, other bands in which the UE device could operate wirelessly may comprise Wi-Max bands or one or more satellite bands. Additionally, the network environment 100 is comprised of three broad categories of communication spaces capable of providing service to UE device 102. In wide area cellular network (WACN) space 104, there may exist any number of Public Land Mobile Networks (PLMNs) that are operable to provide cellular telephony services which may or may not include packet-switched data services. Depending on the coverage area(s) and whether the user is roaming, WACN space 104 can include a number of cellular RANs, associated home networks (i.e., home PLMNs or HPLMNs) 110 and visited networks (i.e., VPLMNs) 112, each with appropriate infrastructure such as Home Location Register (HLR) nodes 115, Mobile Switching Center (MSC) nodes 116, and the like. Since the WACN space 104 may also include a General Packet Radio Service (GPRS) network that provides a packet radio access for mobile devices using the cellular infrastructure of a Global System for Mobile Communications (GSM)-based carrier network, a Serving GPRS Support Node (SGSN) 114 is exemplified therein. Additionally, by way of generalization, the PLMNs of the WACN space 104 may comprise networks selected from the group comprising one or more Enhanced Data Rates for GSM Evolution (EDGE) networks, Integrated Digital Enhanced Networks (IDENs), Code Division Multiple Access (CDMA) networks, Universal Mobile Telecommunications System (UMTS) networks, Universal Terrestrial Radio Access Networks (UTRANs), or any 3rd Generation Partnership Project (3GPP)-compliant network (e.g., 3GPP or 3GPP2), all operating with well known frequency bandwidths and protocols.

Further, UE device 102 is operable to obtain service from an access network (AN) space 106 that is operably associated with the WACN space 104. In one implementation, the AN space 106 includes one or more generic access networks (GANs) 118 as well as any type of WLAN arrangements 120. GAN 118, described in additional detail below, is operable to provide access services between UE device 102 and a PLMN core network using a broadband Internet Protocol (IP)-based network. WLAN arrangements 120 provide short-range wireless connectivity to UE device 102 via access points (APs) or "hot spots," and can be implemented using a variety of standards, e.g., IEEE 802.11b, IEEE 802.11a, IEEE 802.11g, HiperLan and HiperLan II standards, Wi-Max standard, OpenAir standard, and the Bluetooth standard. Accordingly, it is envisaged that the AN space 106 may also be inclusive of UMA-based access networks that deploy UMA network controller (UNC) nodes for effectuating seamless transitions between cellular RAN (part of the WACN space 104) and unlicensed wireless networks.

In one embodiment, interfacing between the WACN and AN spaces may be effectuated in accordance with certain standards. For instance, GAN 118 may be interfaced with a PLMN core using the procedures set forth in the 3GPP TR 43.901 and 3GPP TS 43.xxx documents as well as related documentation. Likewise, WLAN 120 may interfaced with a PLMN core using the procedures set forth in the 3GPP TS 22.234, 3GPP TS 23.234 and 3GPP TS 24.234 documents as well as related documentation, and may therefore be referred to as an Interworking WLAN (I-WLAN) arrangement.

Additionally, there may exist an access network (AN) space 108 not interfaced to the WACN space 104 that offers short-range wireless connectivity to UE device 102. For instance, AN space 108 may comprise WLANs 122 offering non-3GPP services, such as communications over "public" access points (hotels, coffee shops, bookstores, apartment buildings, educational institutions, etc., whether free or for fee), enterprise access points, and visited (other enterprise) access points where the user may not be a member of that enterprise but is allowed at least some services.

Given the mosaic of the wireless network environment 100 in which UE device 102 may be disposed, it is desirable that a vertical handover mechanism exists such that the user can engage in a call as it moves from a PLMN's radio access network (RAN) to a GAN (i.e., handover in) or from GAN to the PLMN's RAN (i.e., handover out). It should be recognized that for purposes of the present patent disclosure, the terms "GAN" or "WLAN" may be interchangeable, and may also include any UMA-based access networks as well. At any rate, in order to facilitate such functionality as well as to customize and enhance the overall user experience associated therewith, the present patent disclosure provides a scheme wherein network information gathered by the UE device as well as information relating to its service options, plans, features, and the like (more generally, "service requirements") is transmitted to a network node disposed in the wireless environment 100 so that suitable network-based logic is operable to respond with appropriate network selections, lists, etc. that the UE device may use. Further, as will be seen in detail below, such network-based logic may invoke procedures that involve one or more correlation and filtering schemes, database queries, such that redirection to more optimal networks may be effectuated in the generalized network environment 100.

Figure 2:
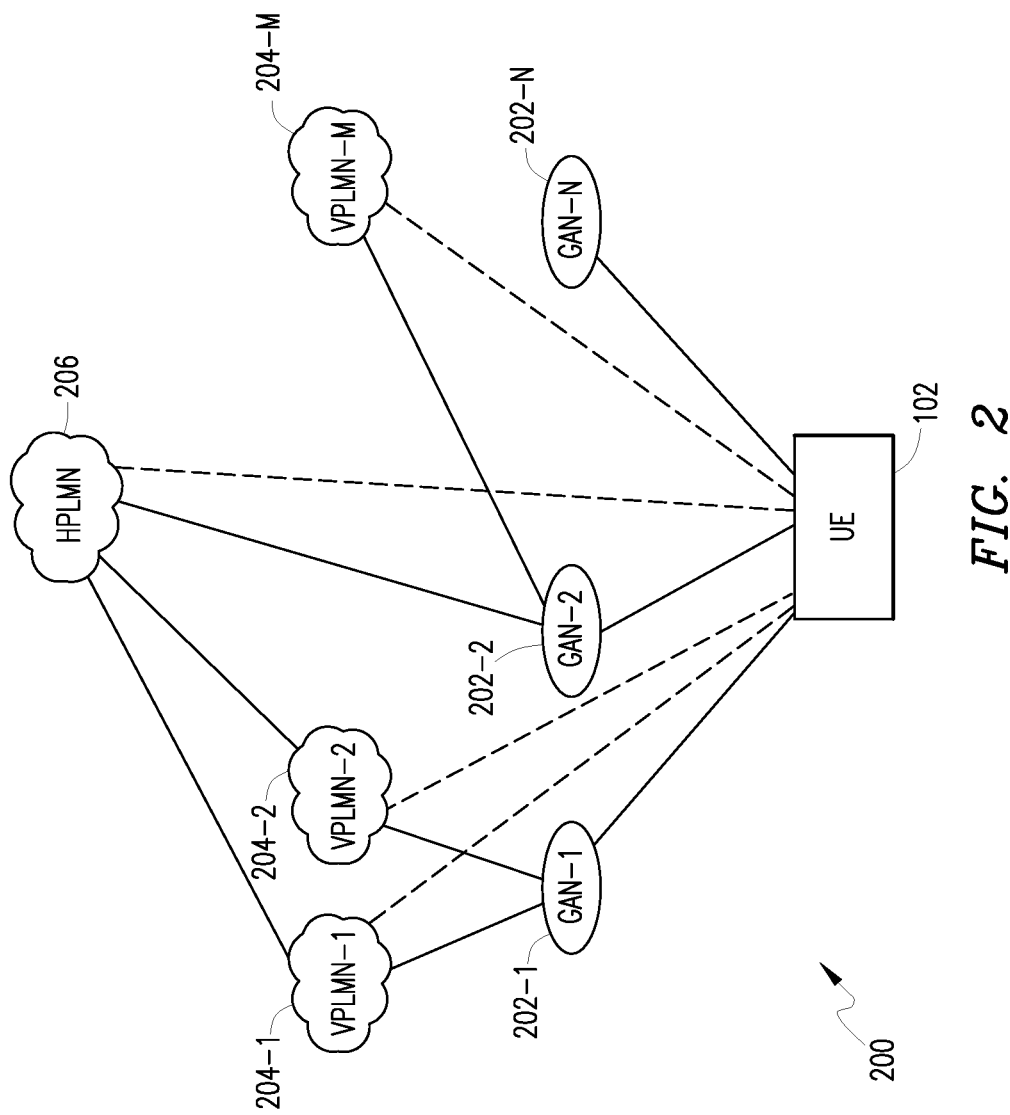
FIG. 2 depicts an exemplary embodiment of a network environment where a user equipment (UE) device is operably disposed in accordance with the teachings of the present patent disclosure.

To formalize the teachings of the present disclosure, reference is now taken to FIG. 2 wherein an exemplary embodiment of a network environment 200 is shown that is a more concrete subset of the generalized network environment 100 illustrated in FIG. 1. As depicted, UE device 102 is operably disposed for discovering a set of PLMNs that allow access via conventional RAN infrastructure in addition to having connectivity with one or more GANs accessible to UE device 102. By way of example, GAN-1 202-1 through GAN-N 202-N, which may be generalized for purposes of the present patent disclosure to also include any type of WLAN and/or I-WLAN arrangements (known or heretofore unknown), are operable to be discovered by UE device. A GAN may support connectivity to one or more PLMNs, or none at all, which can include VPLMNs 204-1 through 204-M as well as HPLMNs (e.g., HPLMN 206) with respect to UE device 102. Where GAN-PLMN connectivity is supported, which PLMNs behind a particular GAN are visible to UE device 102 may depend on a number of commercial factors, e.g., contractual arrangements between GAN operators and PLMN operators. As illustrated, GAN-1 202-1 supports connectivity to VPLMN-1 204-1 and VPLMN-2 204-2. Likewise, GAN-2 202-1 supports connectivity to VPLMN-M 204-M as well as to HPLMN 206. On the other hand, GAN-N 202-N has no connectivity to the wide area PLMNs.

As is well known, each of the wide area cellular PLMNs may be arranged as a number of cells, with each cell having sectors (e.g., typically three 120-degree sectors per base station (BS) or cell). Each cell may be provided with a cell identity, which can vary depending on the underlying WACN technology. For example, in GSM networks, each individual cell is provided with a Cell Global Identification (CGI) parameter to identify them. A group of cells is commonly designated as a Location Area (LA) and may be identified by an LA Identifier (LAI). Further, at the macro level, the PLMNs may be identified in accordance with the underlying technology. For instance, GSM-based PLMNs may be identified by an identifier comprised of a Mobile Country Code (MCC) and Mobile Network Code (MNC). Analogously, the CDMA/TDMA-based PLMNs may be identified by a System Identification (SID) parameter. Regardless of the cellular infrastructure, all cells broadcast the macro level PLMN identifiers such that a wireless device (e.g., UE device 102) wishing to obtain service can identify the wireless network.

Figure 3:
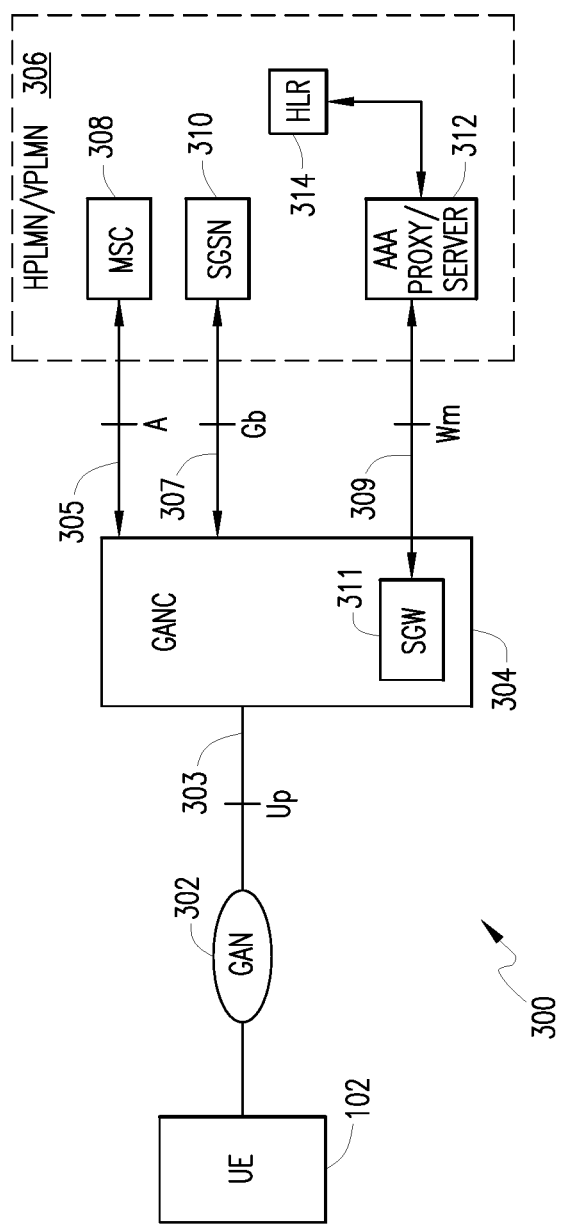
FIG. 3 depicts a functional block diagram of a network system where a wide area cellular network (WACN) such as a Public Land Mobile Network (PLMN) is accessible through a generic access network (GAN) and associated controller (GANC)

FIG. 3 depicts a functional block diagram of an exemplary network system 300 where a wide area cellular PLMN 306 is accessible to UE device 102 through a GAN 302 and associated controller (GANC) 304. Essentially, in the embodiment shown, GAN 302 is operable as a broadband IP-based access network providing access to the well known A/Gb interfaces of PLMN 306, wherein GANC 300 is a network node coupled to GAN 302 via a Up reference point interface 303. As provided in applicable 3GPP specification documents, the Up reference point 303 defines the interface between GANC 304 and UE device 102. Where the GAN is operable to co-exist with the GSM/EDGE RAN (GERAN) infrastructure, it interconnects to the core PLMN via the same A/Gb interfaces used by a standard GERAN Base Station Subsystem (BSS) network element. Accordingly, the functionality of GANC 304 includes necessary protocol interworking so as to emulate the functionality of the GERAN BSS (not shown in this FIGURE). The A-interface 305 defines the interface for GSM-based circuit-switched (CS) services and is disposed between GANC 304 and an MSC 308 of PLMN 306. The Gb-interface 307 defines the interface for GPRS-based packet-switched (PS) services and is disposed between GANC 304 and an SGSN 310 of PLMN 306. A Security Gateway (SGW) 311 may also be included in GANC 304 that is interfaced via a Wm reference point 309 (as defined by 3GPP TS 23.234) with an Authentication, Authorization and Accounting (AAA) proxy/server node 312 disposed in PLMN 306, wherein an HLR 316 is operably coupled to AAA node 312. Those skilled in the art will recognize that similar infrastructure may be deployed in a UMA-based implementation wherein a UMA network controller or UNC is operable in generally in the same way as GANC 304.

In operation, GANC 304 appears to the core PLMN 306 as a GERAN BSS network element by mimicking the role of the Base Station Controller (BSC) in the GERAN architecture as seen from the perspective of the A/Gb interfaces. Accordingly, PLMN 306 to which GANC 304 is connected is unaware of the underlying access mechanism being supported by GANC, which is different from the radio access supported by the BSC. As alluded to before, GAN 302 disposed between generic access (GA)-enabled UE device 102 and GANC 304 may be effectuated by a suitable broadband IP network. The overall functionality provided by GANC 304 includes the following:

S User plane CS services that involve interworking CS bearers over Up interface to CS bearers over A-interface, including appropriate transcoding of voice to/from UE and PCM voice from/to the MSC.

S User plane PS services that involve interworking data transport channels over Up interface to packet flows over Gb interface.

S Control plane functionality including: (i) SGW for the set-up of secure tunnel with UE for mutual authentication, encryption and data integrity; (ii) registration for GAN service access and providing system information; (iii) set-up of GAN bearer paths for CS and PS services (e.g., establishment, management, and tear-down of signaling and user plane bearers between UE the GANC); and (iv) GAN functional equivalents to GSM Radio Resource (RR) management and GPRS Radio Link Control (RLC) such as for paging and handovers.

Figure 4A:
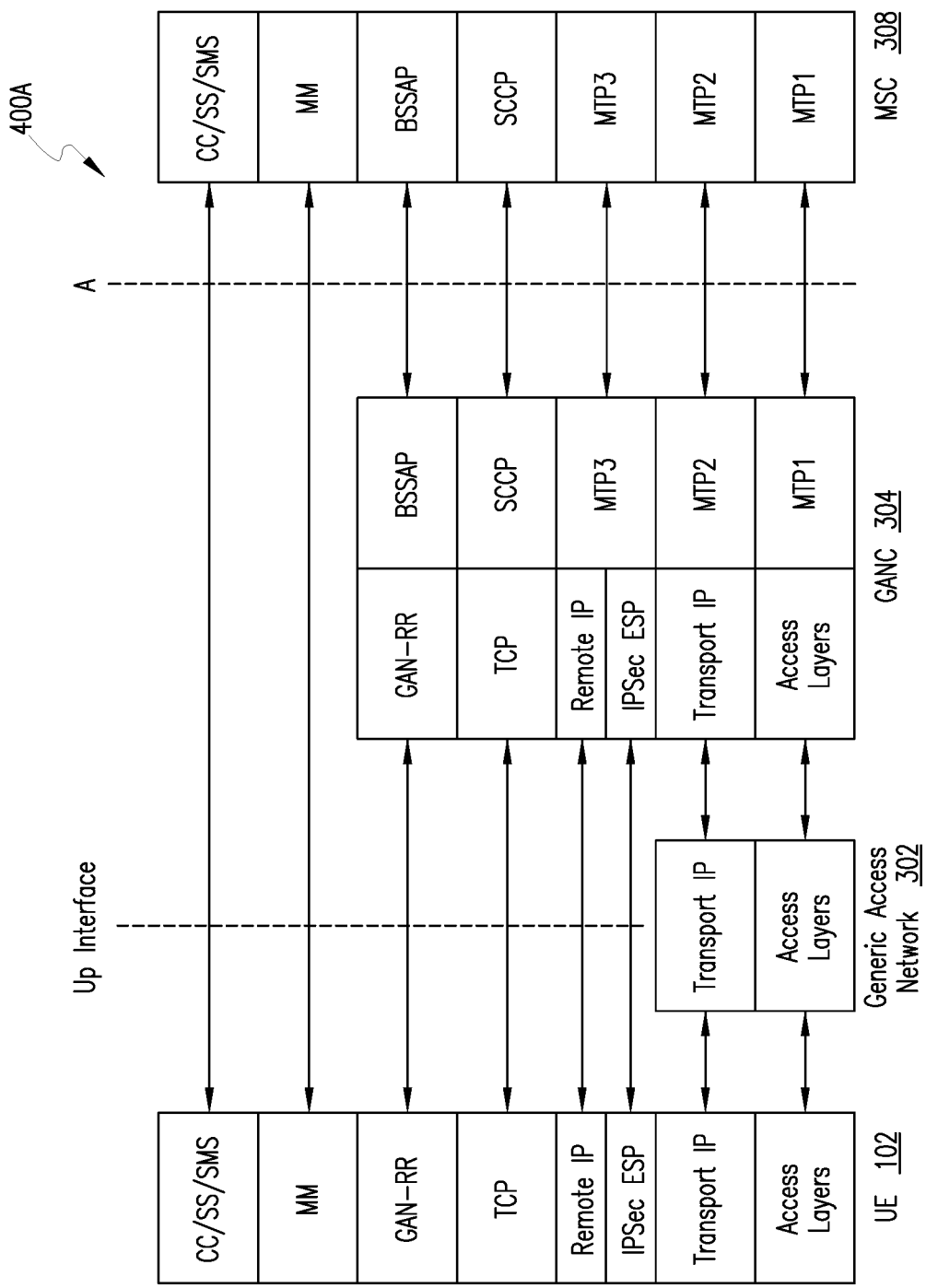
FIG. 4A depicts an exemplary embodiment of a circuit-switched (CS) protocol stack operable with the network system shown in FIG. 3.
Figure 4B:
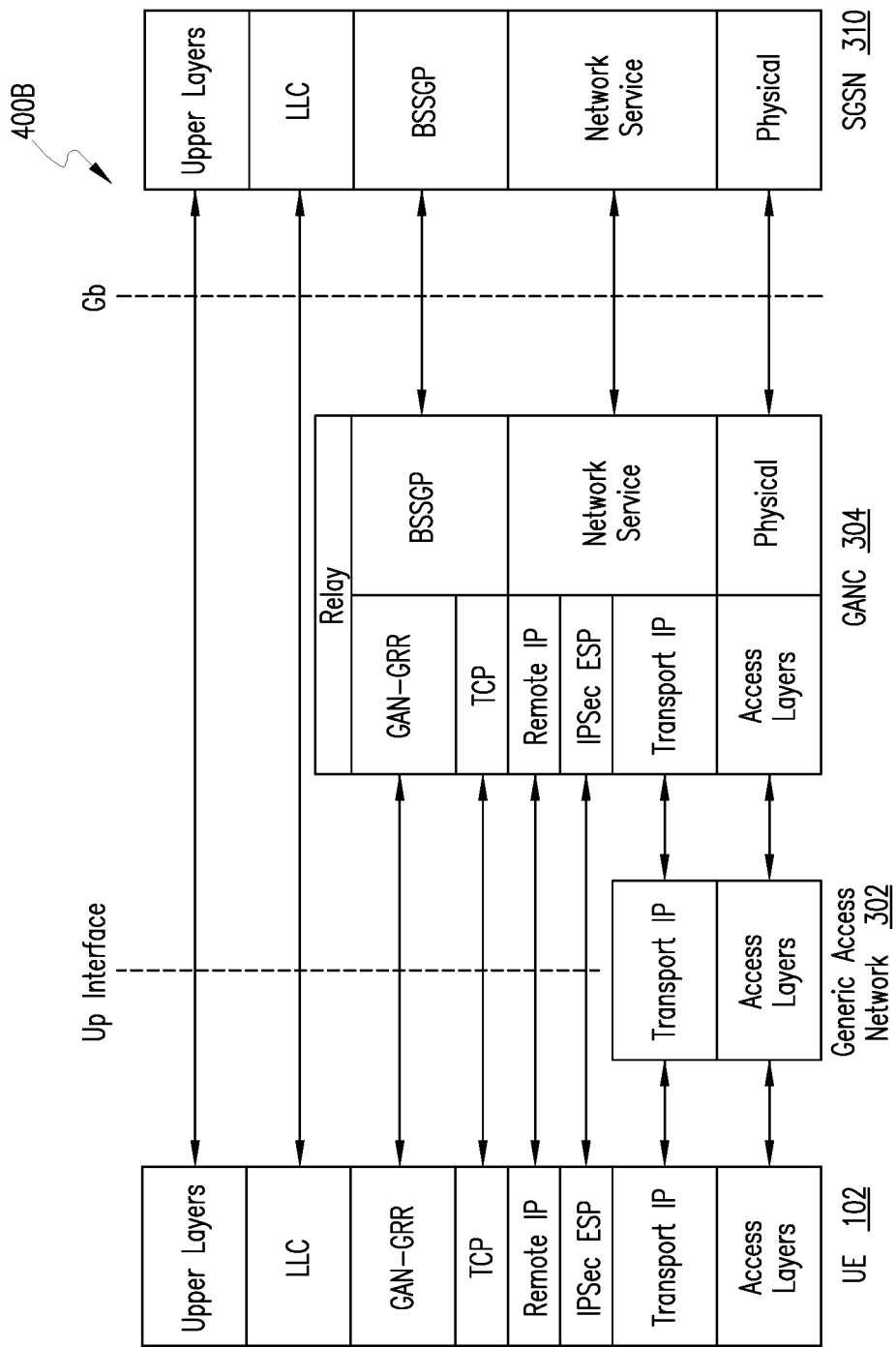
FIG. 4B depicts an exemplary embodiment of a packet-switched (PS) protocol stack operable with the network system shown in FIG. 3.

FIG. 4A depicts an exemplary embodiment of a protocol stack 400A operable with the CS domain signaling plane associated with the network system 300 shown in FIG. 3. Likewise, FIG. 4B depicts an exemplary embodiment of a protocol stack 400B operable with the PS domain signaling plane associated with network system 300. Additional details regarding generic access to the A/Gb interfaces and associated architecture may be found in the applicable 3GPP specifications identified in the U.S. provisional patent applications that have been referenced and incorporated hereinabove. Furthermore, to be consistent with the broad generalization of the teachings of the present patent disclosure, an "access network server" may comprehend a network node or element operable to interface between the core PLMN and the UE as set forth above, which may include a GANC or a UNC as a specific implementation.

Figure 5A:
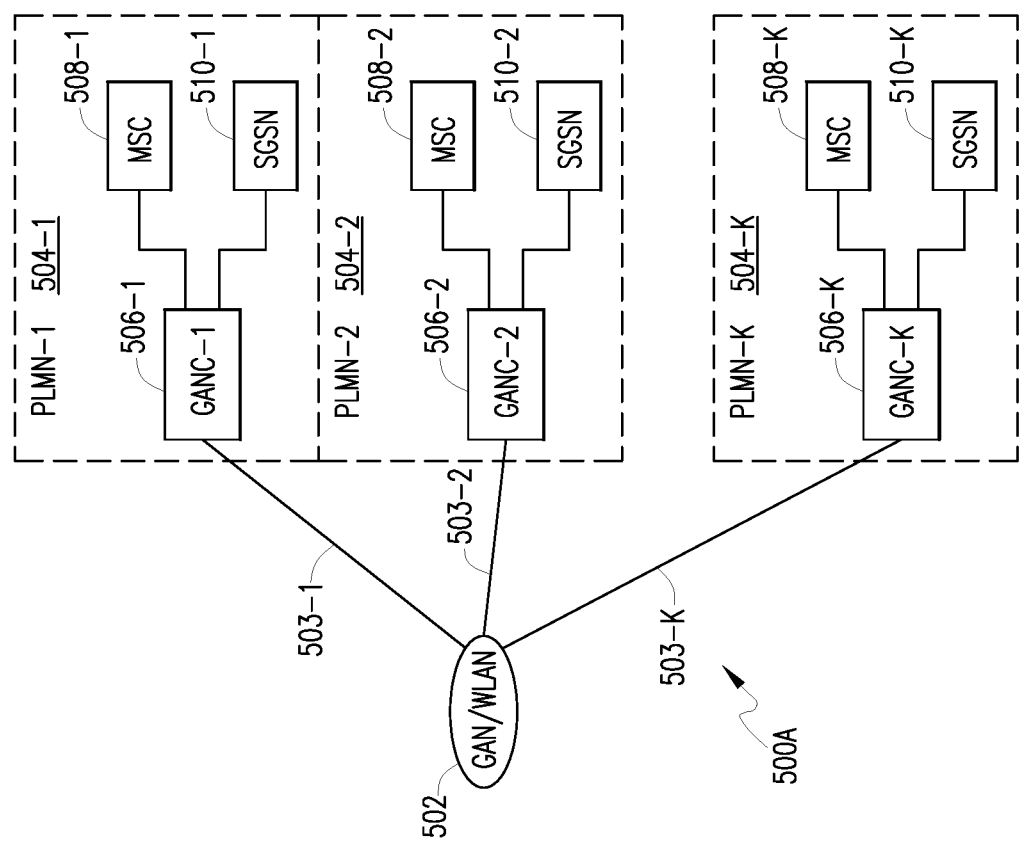
FIG. 5A depicts a network arrangement where an access network (GAN or Wireless LAN) is operable to connect to a plurality of PLMNs according to one embodiment wherein each PLMN is served by a corresponding GANC.

It should be apparent to those skilled in the art that given the mosaic of various GANs/WLANs and PLMNs provided within a generalized network environment such as the network environments described hereinabove with respect to FIGS. 1 and 2, a number of GAN/GANC configurations are possible from the perspective of providing access between a UE device and the available WACNs (i.e., PLMNs). FIG. 5A depicts a network arrangement 500A where a single access network (AN) 502 is operable to connect to a plurality of PLMNs 504-1 through 504-K according to one embodiment, wherein each PLMN is served by a corresponding GANC. By way of illustration, AN 502 may be generalized as a GAN which can be a WLAN operable with the GANC protocols described above, wherein a plurality of Up interfaces 503-1 through 503-K are supported for coupling to the GANCs. Reference numerals 506-1 through 506-K refer to a plurality of separate GANC nodes, each for interfacing with a particular PLMN associated therewith, wherein MSCs 508-1 through 508-K and SGSNs 510-1 through 510-K are illustrative of respective PLMN's infrastructure. One skilled in the art should recognize that although each PLMN is provided with a SGSN node, it is not a requirement for purposes of the present disclosure, and PLMNs 504-1 through 504-K may be implemented in accordance with different wide area cellular technologies, protocols and standards.

Figure 5B:
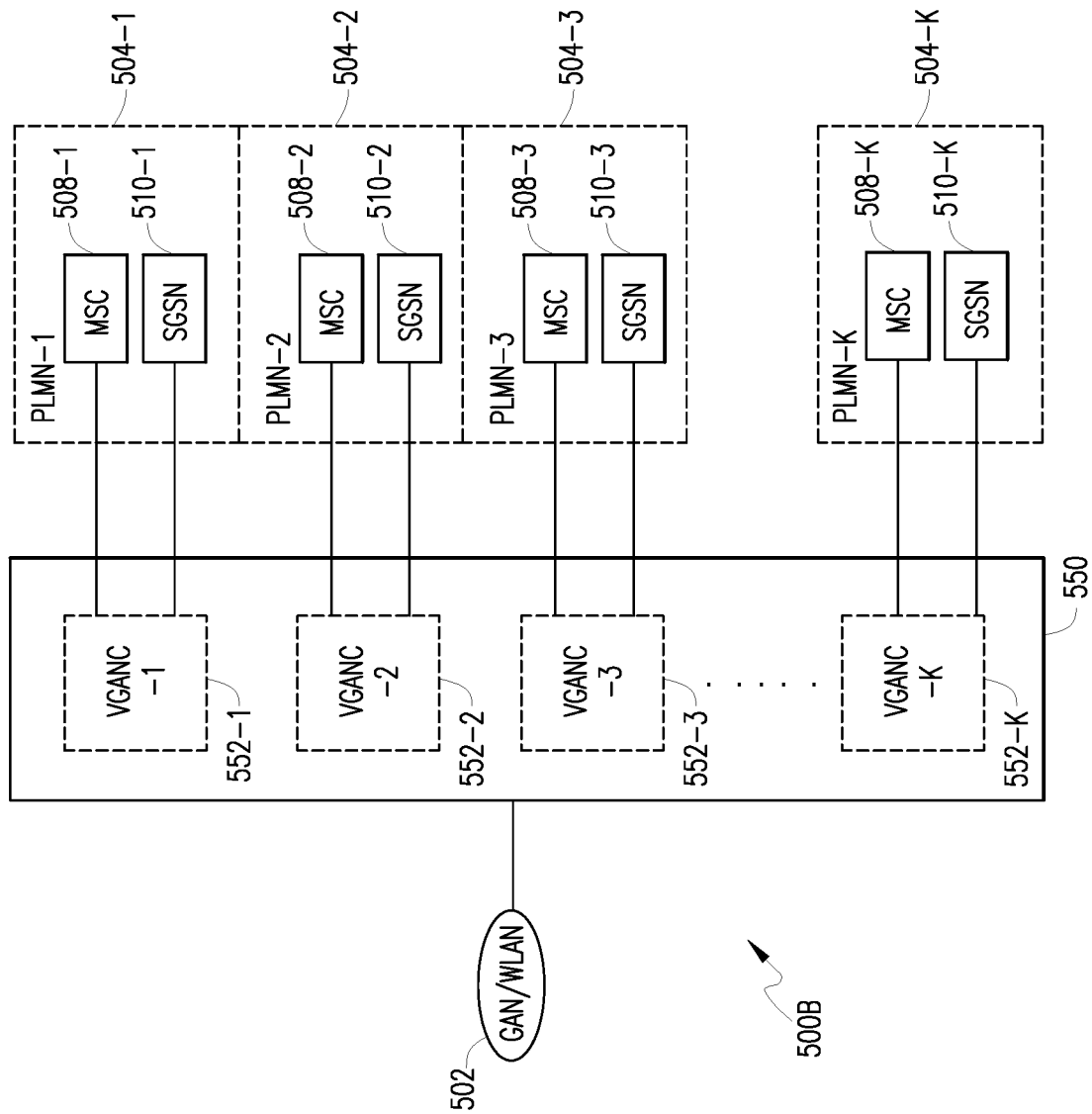
FIG. 5B depicts a network arrangement where an access network (GAN or Wireless LAN) is operable to connect to a plurality of PLMNs according to one embodiment wherein a plurality of virtual GANC partitions on a single GANC are operable to serve the corresponding PLMNs.

Referring now to FIG. 5B, depicted therein is an alternative network arrangement 500B where AN 502 (GAN or Wireless LAN) is operable to connect to the plurality of PLMNs 504-1 through 504-K via a single physical GANC 550 that supports a plurality of virtual GANC partitions 552-1 through 552-K. Each virtual GANC (VGANC) is independently operable to provide the requisite A/Gb interfacing functionality with respect to a corresponding PLMN. Accordingly, there is one logical GANC per PLMN that it connects to. Such a deployment may be used where the PLMNs supporting the WLAN connectivity do not see the need to own and operate their own GANC.

Based on the foregoing discussion, it should be appreciated that the GAN architecture provides a generalized framework for interworking WLANs with 3GPP-compliant WACNs by utilizing existing protocols, e.g., GPRS, whereby little or no adaptation or standardization work is required to be performed in the core. This allows for services to be handed over from a GAN/WLAN to a 3GPP-compliant WACN and vice versa, keeping the signaling and user plane traffic intact. However, as CS-switched protocols and GPRS protocols (Logical Link Control or LLC and Sub-Network Dependent Convergence Protocol or SNDCP) are used, the GAN/WLAN that is chosen must be able to reach an MSC/SGSN that is in the same PLMN as the MSC/SGSN used to terminate the GAN/WLAN traffic. To further complicate matters, a GAN/WLAN could connect to many PLMNs each having a separate, independently discoverable GANC node as described hereinabove. When a user encounters such a GAN/WLAN environment, there is currently no standardized procedure to define the selection of a particular GANC. As a consequence, a number of potential issues arise wherein the overall user experience as well as call handover behavior may be negatively impacted. For instance, if a GA-compliant UE device that operates in dual mode (i.e., two different technologies, each preferably in a separate band, for example) discovers a macro PLMN or WACN and subsequently chooses a GANC that belongs to a different WACN, handover between the AN and WACN spaces would not work. Such issues may also arise in network arrangements where a single GANC is partitioned to support a number of independently discoverable VGANC partitions.

Further, because of various levels of technology penetration and deployment in different regions and countries, additional complexities can arise where the AN and WACN spaces are to be interfaced using the GAN/WLAN approach. For example, a GA-compliant UE device may find itself in an area where there is no WACN coverage but there is WLAN coverage. If one or more WLANs are based on the I-WLAN approach rather than the GAN architecture, it is preferable that the UE differentiate between GAN and I-WLAN due to the differences in various control processes, e.g., registration, de-registration, etc., in addition to whatever service differences that may exist between them. For purposes of highlighting the scope of the present patent disclosure, some of the user experience-related issues are set forth below.

S The UE is not currently registered on a WACN. Here the UE cannot check the cellular band signals to determine the country it is in (i.e., MCC is unknown) to select the best or optimal provider. Although HPLMN is usually selected first, VPLMN preference may depend on location (e.g., country). In this situation, the UE may not know which VPLMN it prefers to connect to when it is examining the available GAN/WLANs.

S The operator's "Preferred PLMN" list on the Subscriber Identity Module (SIM) or Removable user Identity Module (RUIM) associated with the user does not take into account the UE's need for PS data services (e.g., GPRS capability) or other services such as Unlicensed Mobile Access (UMA) services. Such a situation may arise where the PLMN list is based only on CS voice roaming agreements and, as a result, the user may not be able to use email and other data services. One skilled in the art will note that such an issue can arise whether or not GAN or I-WLAN is used.

S Some or all of the operator-controlled lists for PLMNs may not be up-to-date, or particular entries for the country the UE is operating in may not be current.

S Because it takes up capacity to update lists over the cellular band, the HPLMN may wish to update lists during off-hours or when the UE is connected over I-WLAN or GAN.

S When there are no WACN signals to allow the UE to determine the MCC, the availability of AGPS (Assisted Global Positioning System) in the UE, or a (manual) user input, as well as recent (i.e., time-stamped) information on WACN MCC may be helpful.

S The case of operation close to country border(s) may result in the UE obtaining signals from more than one MCC, enabling user choice or "least cost" choice.

Those skilled in the art should recognize that the list set forth above is purely illustrative rather than limiting. It is envisaged that upon reference hereto various related problems may become apparent with respect to user experience and call behavior in the context of interfacing between GAN/WLAN and PLMN spaces.

For purposes of the present disclosure, the GA-capable UE may operate in either Automatic or Manual mode with certain differences in network discovery and selection procedures, although the particular features and capabilities of the two may vary depending on the applicable specification(s) as well as any modifications and changes that may be made to them. In general, the Manual mode allows the user to do more detailed selection/filtering of the available PLMNs, the bearer(s) to be used, and potentially even of the method to be used when using WLAN or other unlicensed radio technology (i.e., I-WLAN, GAN, or just a connection through the WLAN to the PLMN). Additional details regarding network discovery and selection may be found in one or more of the above-referenced U.S. provisional patent application(s) and nonprovisional patent application(s).

Figure 6:
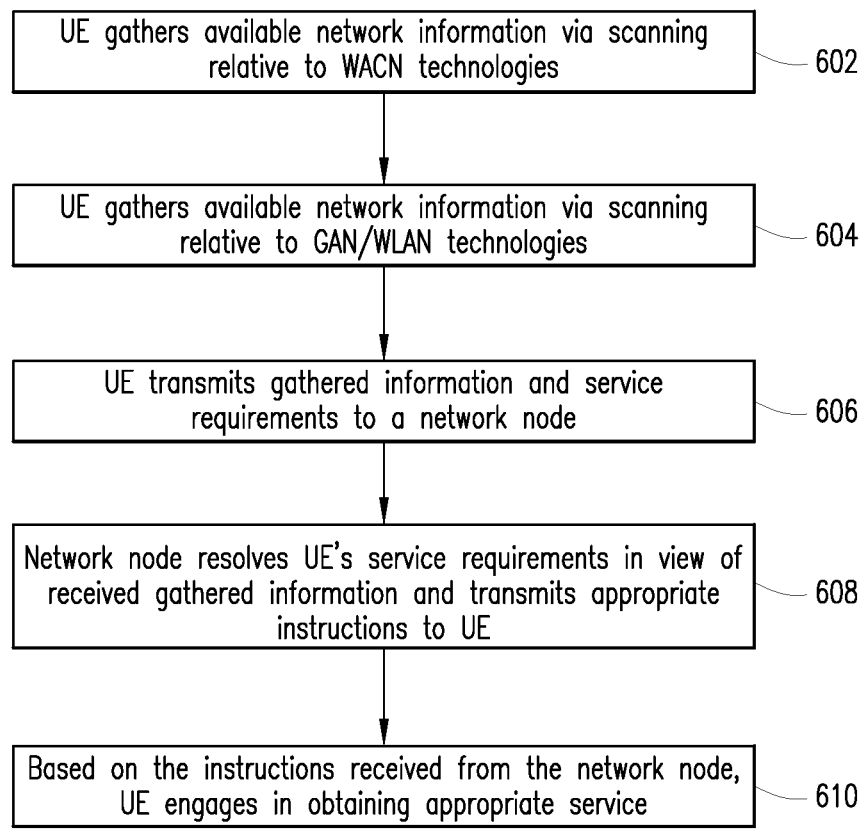
FIG. 6 is a flowchart of a generalized network discovery and selection scheme according to one embodiment.

Referring now to FIG. 6, shown therein is a flowchart of a generalized network discovery and selection scheme according to one embodiment wherein a UE device is disposed in a network environment comprising a GAN/WLAN space as well as a WACN space. As illustrated, the flowchart of FIG. 6 captures a methodology where the UE device gathers appropriate network information upon power-up and initial discovery (as per applicable 3GPP-compliant procedures), which is then transmitted to a network node for determining a more optimal network arrangement (i.e., appropriate GANC+PLMN combination), preferably in view of the UE device's service requirements that may also be advertised to the network node. Accordingly, by effectuating appropriate resolution of UE-discovered network information and its service requirements, the network node is amenable to provide suitable instructions to the UE device for obtaining better service instantiation, which may include redirection to more suitable networks, location-based filtering, and the like.

Continuing to refer to FIG. 6, at block 602, the UE device gathers network information via scanning relative to one or more WACN technologies, bands, and frequencies. Additionally or alternatively, the UE device is also adapted to gather network information via scanning relative to one or more GAN/WLAN technologies, bands, and frequencies (block 604). Thereafter, the UE device transmits the gathered network information as well as service/feature requirements (e.g., voice-only services, data-only services, voice-and-data services, GAN services, handover services, UMA services capability, calling plans associated with the UE device, and/or location area information associated with the UE device, et cetera) to a network node (block 606). In one embodiment, the gathered network information may comprise at least one of cell identity information of a WACN on which the UE device is registered (i.e., CGI information of a registered GSM/GERAN), CGI/cell ID information relating to other available wide area cellular networks, cause values of any prior registration failures, Broadcast Control Channel (BCCH) information of at least one available wide area cellular network, and Packet Control Channel (PCCH) information of at least one available wide area cellular network. As alluded to hereinabove, in one embodiment, WACNs may be identified by their {MCC,MNC} combinations. Also, additional features such as identifying whether a particular WACN is data-capable (e.g., GPRS-capable) may also be provided. To the extent the UE device is adapted to operate based on various network lists, stored or otherwise, additional selection criteria and filters such as Forbidden GAN/PLMN lists, Priority GAN/PLMN lists (which may be stored, for example, in a Subscriber Identity Module (SIM) or Removable user Identity Module (RUIM), or in a device memory) and the like, may also be provided to the network node. In a further implementation, the UE could also list PLMNs that only provide WACN and/or WAN coverage.

It should be realized that scanning operations set forth above may be performed via active scanning or passive scanning methods. Also, there may be more than one band operable with GANs and/or with PLMNs. In one instance, a frequency band may be selected from the group comprising 450 MHz, 850 MHz, 900 MHz, 1800 MHz, 1700 MHz, 1900 MHz, 2100 MHz, 2700 MHz, or other frequencies and/or any satellite bands.

Upon receiving the gathered network information, service requirement information and/or location information from the UE device, the service logic associated with the network node is operable to resolve the service requirements requested by the UE device in view of the other bodies of the received information so that a determination may be made as to whether additional or alternative network arrangements are available for the UE device. In some implementations, such resolution may involve interfacing with additional network nodes and databases (e.g., HPLMN and/or home GANC, service databases, roaming databases, and so on). Thereafter, appropriate instructions may be provided via a suitable response message to the UE device, including pertinent information relative to any additional or alternative network arrangements. These operations are illustrated in block 608. Based on the instructions received from the network node, the UE device may then engage in obtaining appropriate service, which can sometimes warrant network redirection (block 610).

Figure 7A:
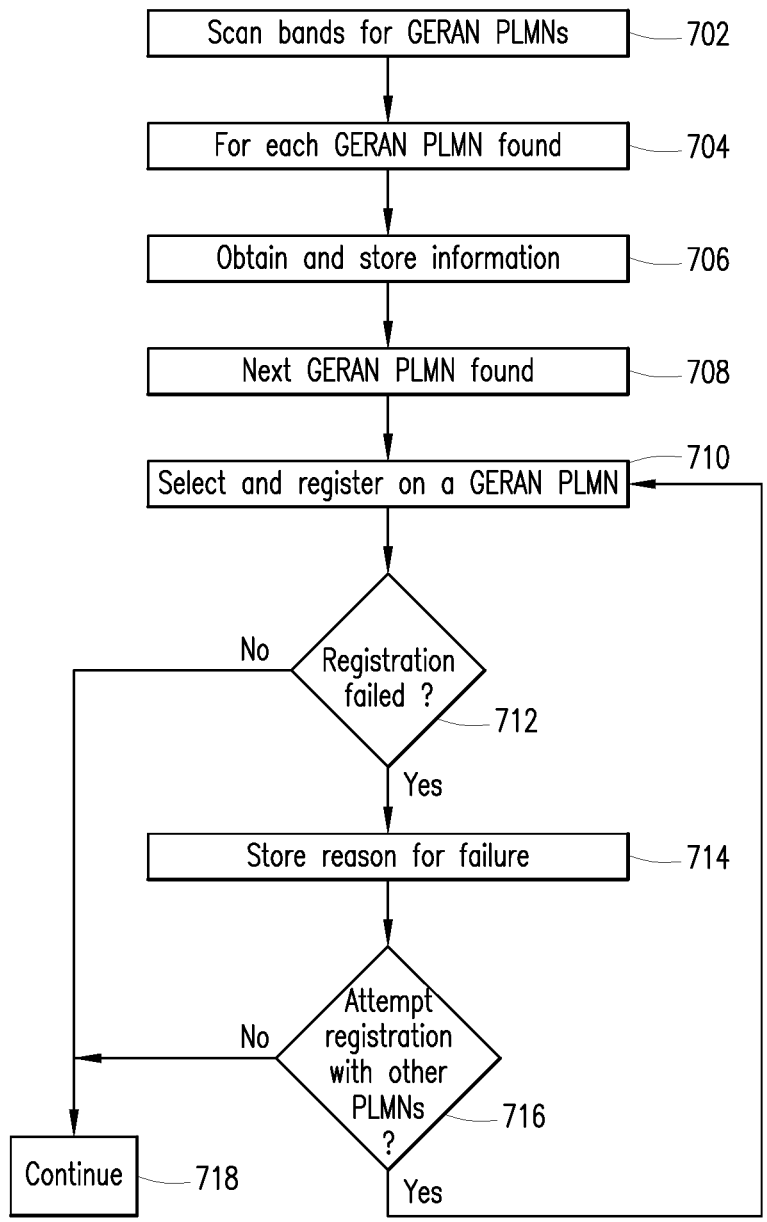
FIG. 7A is a flowchart of a method of gathering network information according to one embodiment for purposes of the present disclosure.
Figure 7B:
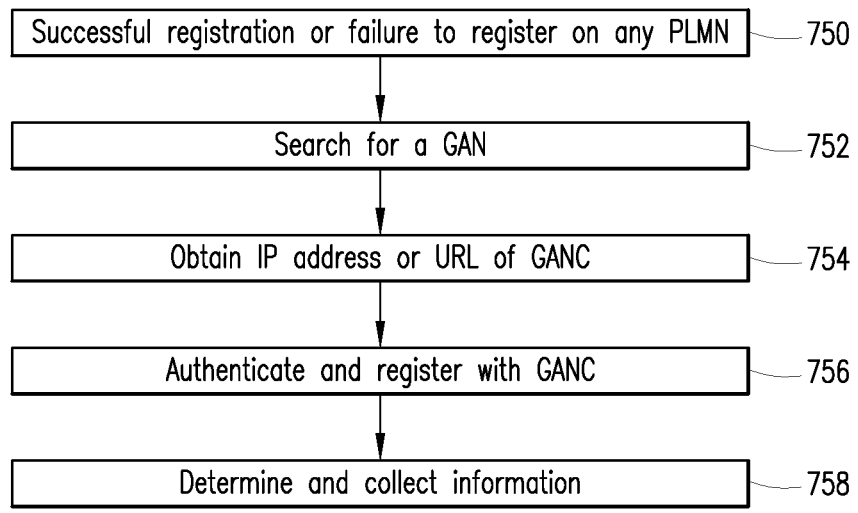
FIG. 7B is a flowchart of a GANC discovery and registration method according to one embodiment wherein one or more GAN services may be requested by a wireless UE device.

FIGS. 7A and 7B depict flowcharts of exemplary scenarios of the network information collection process set forth above. Presently, applicable GAN specifications state that a UE device, e.g., a mobile station (MS), shall first register on a GSM/GERAN PLMN if found and allowed according to current 3GPP network selection procedures. Accordingly, the process flow exemplified in FIG. 7A begins with scanning available bands for GERAN PLMN networks (block 702). For each GERAN PLMN found, information is obtained and stored (blocks 704, 706 and 708), e.g., CGI information, BCCH and/or PCCH information, etc. The UE device then selects and registers on a GERAN PLMN (block 710) according to 3GPP specifications, which may be mediated by the UE device's network lists, preferences, and other filters. If the registration with a particular PLMN fails, the reason for failure is stored as a cause value (blocks 712 and 714). Once the reason for failure is stored, the registration process may repeat with respect to the additional PLMNs discovered according to 3GPP specifications (block 716). On the other hand, if the PLMN registration is successful or if registration with no PLMN has been successful and the UE device is allowed to operate in GAN-only mode, further process flow may accordingly follow (block 718). However, if the PLMN registration is successful but that PLMN does not support GAN connectivity, various concerns might arise that could negatively impact the service selection behavior of the UE device.

With respect to operating in GAN-mode, the UE device is operable to provide a number of information elements to a GANC node with which it establishes initial connectivity. Preferably, as pointed out in the foregoing discussion, such information can include network information gathered via scanning in other bands or modes as well as service requirements. Referring to FIG. 7B in particular, upon successful registration a PLMN or failure to register on any PLMN (block 750), the UE device is operable to search for a GAN network (block 752), preferably according to applicable 3GPP specifications. Once a Uniform Resource Locator (URL) or IP address of a GANC node has been obtained (block 754), the UE device authenticates and registers with the GANC using, for instance, known Generic Access-Resource Control (GA-RC) REGISTER REQUEST messaging (block 756). Alternatively, where a default GANC's information is stored in the UE device, such information may be utilized in initiating registration. Typically, GANC information is comprised of a GANC Security Gateway (SGW) address, a GANC address and a GANC TCP port number. The IP address of the SGW may be locally stored in the UE device, or if the device is provided with a Fully Qualified Domain Name (FQDN), a DNS query may be performed to obtain the IP address. In accordance with the discussion set forth in the foregoing sections, such a registration message to the GANC may include information elements pertaining to any of the following in any combination:

- registered GERAN CGI information if available;
- if the registration is for voice and/or data;
- services and features requested by the UE device, e.g., voice-only services, data-only services, voice-and-data services, GAN services, multimedia services, value-added services, etc.;
- if handover is required;
- if home-country-calls-only calls are required;
- prior GERAN PLMN registration attempts and associated cause values for failure;
- the registration request may also include GERAN PLMN information for which registration was successful but a GANC redirect was received. Any VPLMN information identified therein may be marked as such (described in detail hereinbelow);
- CGI information for other PLMNs available; and
- BCCH/PCCH information for available PLMNs. For instance, in one implementation, BCCH/PCCH information for all available PLMNs is included. In other implementations, BCCH/PCCH information for a portion of available PLMNs may be included.

Further, upon successful authentication and registration with the GANC, additional network information may be collected by the UE device (e.g., appropriate network arrangement via a suitable response message), as illustrated in block 758.

In addition to the various information elements described above with respect to an exemplary registration request, other information elements pertaining to location and/or identification may also be included. By way of illustration, such location and identification information may include:

A. Cellular/WACN
1. MCC
   a. Cellular MCC (e.g., GSM)
   b. Country code associated with a microcell (or even a small macrocell) on a vehicle (e.g., ships, planes, trains, buses, etc.)
2. MNC
3. LAI
4. CGI, etc.
5. Network generated information such as current cell (and sector)
6. Geolocation based on network information, of varying degrees of accuracy
7. Geolocation based on handset assisted GPS or other positioning system B. WLAN/GAN
Service Set ID (SSID)
Other C. Manual input information and other information
1. AP building and floor and room location and similar descriptive information.
2. AP information based on location information derived from dual mode handsets, where the location of the handset is then transferred to a database to provide some (perhaps gross or rough) information on the location of the AP. Could be geographic information or could indicate the LAI or CGI of cellular systems.
3. AP information, as in (2), but derived from recent information from the handset, e.g., the cell and network that the handset was viewing a few minutes ago before the user walked into a building and lost coverage. The time between loss of cellular or other information and the connection to the access point is a means of further identifying the potential lack of accuracy of the information.
4. Indication of the type of AP.
   a. small, potentially easily moved
   b. fixed in place (at least initially)
   c. mobile, as on a ship or in a plane or on a train—there may be specific types of country codes when the devices in part of a vehicle
5. Whether the connectivity of the AP has changed.
6. Location (GPS or other, even manual entry) of the ship, plane or vehicle with an AP or microcell.

It should be realized by those skilled in the art that the location information may be developed by one element (i.e., a UE device) and stored in another element (AP, or microcell or base station controller or GANC), or even in a "universal" database within a PLMN or operator. Further, it should be recognized that location of an AP and its relation to the elements of other (even competing) networks is useful for many purposes, such as assisting in handover (or similar) transition of the handset connectivity, which may include "roving" as defined in 3GPP documentation. By way of illustration, exemplary uses of location and identification information include:

Identification of the operator and/or PLMN or otherwise defined network
Identification of relationship with an operator or PLMN or otherwise defined network
Identification of location
   a. For E911 and public safety purposes
   b. Including passing of information to the PSAP (Public Safety Answer Point)
   c. For commercial purposes Operation of a cellular network or of an unlicensed network.

Based on the foregoing, it will be realized that the registration procedure may be initiated towards a default AN node (e.g., a GANC or a UNC) after a successful discovery procedure or after a failed registration towards a serving AN node, where no GAN PLMN list was provided to the UE from the default AN node. Further, the registration procedure may also be initiated towards the default AN node when no additional PLMNs can be selected from the GAN PLMN list received from the default AN node. Additionally, the registration procedure may be triggered towards the default AN node where the UE wishes to perform manual PLMN selection. If the UE is already successfully registered with a serving AN node and a manual PLMN selection is initiated, the UE first deregisters from the current serving AN node and then initiates registration towards the default AN node. In this embodiment, the registration request may also include an indication that a list of PLMN identities is requested for manual selection.

Additional operations and/or information elements may be involved if the registration processes take place after the initial network discovery and registration process by the UE device as set forth above. For instance, with respect to WACN space (e.g., GERAN), if the UE device receives a redirect message from a GANC node (which could be a separate message or part of a general redirect message), the UE device may deregister from the current serving GERAN VPLMN and attempt registration on the VPLMNs in a number of ways. By way of illustration, the VPLMNs may be provided by the GANC in some priority order that may be followed by the UE device. Alternatively, if no order has been provided, a VPLMN may be chosen from the supplied list at random. With respect to subsequent registrations in GAN space, if the UE device has been redirected to another VPLMN and registration with that new VPLMN is successful, the UE device may be required to re-register with the home GANC using the same GAN as before. Alternatively, the UE device may register with the GANC associated with the new VPLMN if that information has been made available by the redirecting GANC. In a still further variation, there may be no subsequent GANC registration pursuant to instructions from the GANC.

Figure 8A:
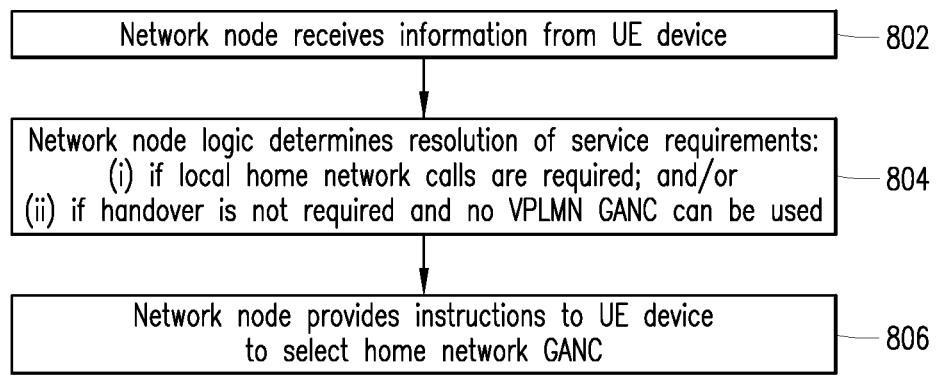
FIGS. 8A and 8B are flowcharts associated with a generalized GANC selection and redirection scheme according to one embodiment.
Figure 8B:
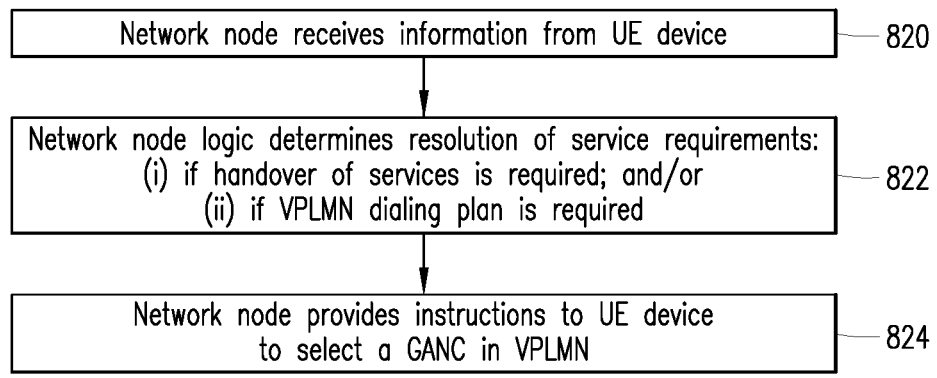

Given the interfacing between the WACN and GAN spaces as described in the foregoing sections, selecting a proper PLMN and GANC combination that allows optimal service may be modulated based on a number of factors, e.g., service requirements, available network information, service capabilities, location information, and the like. When a serving network node (e.g., a default GANC or a provisioning GANC) receives appropriate information from the UE device, at least part of the service logic involves resolving whether a home GANC or a GANC associated with a VPLMN should provide service to the UE device. FIGS. 8A and 8B are two flowcharts associated with GANC selection and optional redirection in accordance with an embodiment of the present patent disclosure. When the serving network node receives information from a UE device (block 802), the service logic associated with the node determines (i) if local home network calls are required; and/or (ii) if handover is not required and no VPLMN GANC can be used (block 804). If so, the network node provides instructions to the UE device to select a home network GANC (block 806). On the other hand, based on the received information from the UE device (block 820), the network node service logic determines (i) handover of services is required; and/or (ii) VPLMN dialing plan is required (block 822). In that case, the network node provides instructions to the UE device to select a VPLMN-associated GANC (block 824).

It should be apparent that the service logic is preferably operable to evaluate and resolve a number of service scenarios based on the combinations of service and feature requirements as well as the network information received from the UE device. Additional details and flowcharts regarding exemplary service scenarios that can include redirection may be found in one or more of the above-referenced U.S. provisional patent application(s) and non-provisional patent application(s), which are incorporated by reference.

Figure 9:
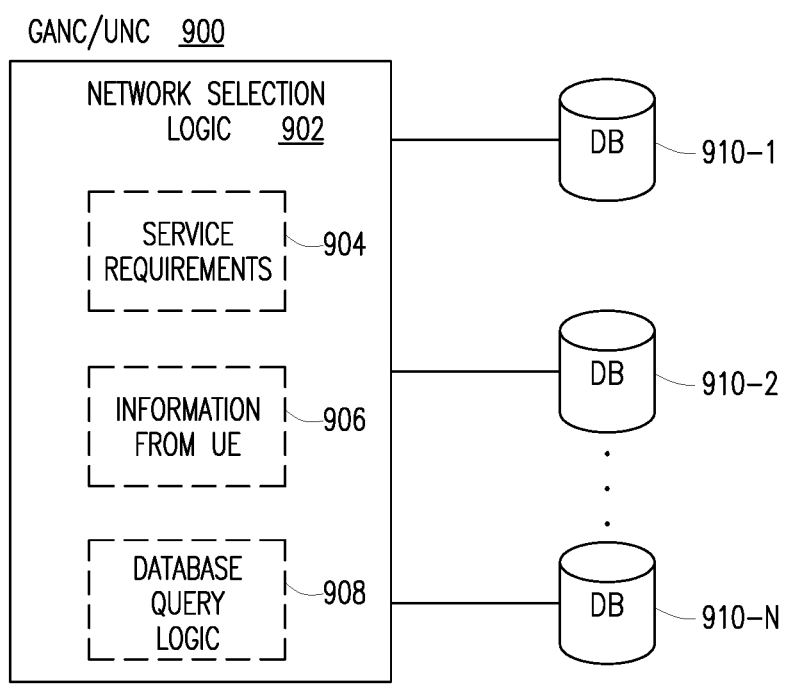
FIG. 9 depicts a functional block diagram of an exemplary GANC/UNC node according to one embodiment.

Referring now to FIG. 9, shown therein is a functional block diagram of an exemplary AN server node 900, e.g., GANC/UNC node 900 according to one embodiment. Those skilled in the art should appreciate that AN server node 900 may be provided in any of the configurations depicted in FIGS. 5A and 5B described hereinabove. Regardless, AN server node 900 includes appropriate network selection logic 902 operable to perform one or more of the procedures set forth above with respect to resolving gathered network information and service/feature requirement information that is provided by a UE device. Accordingly, in one embodiment, suitable storage areas may be provided for storing service/feature requirements 904 as well as gathered network information 906. Database query logic 908 is provided to facilitate database query and interrogation of local and/or remote databases, e.g., DB 910-1 through DB 910-N.

Figure 10:
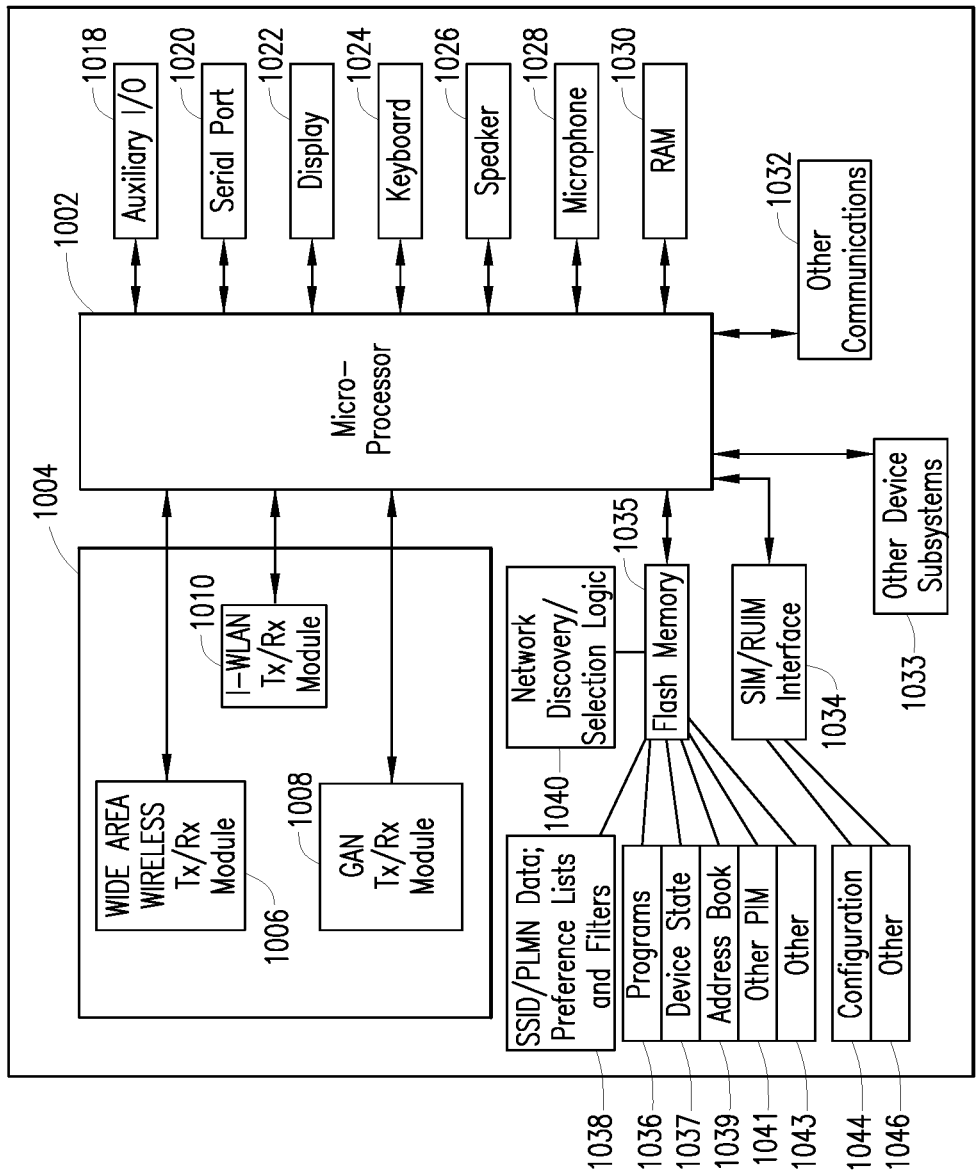
FIG. 10 depicts a block diagram of an embodiment of a UE device operable according to the teachings of the present patent disclosure.

FIG. 10 depicts a block diagram of an embodiment of a UE device operable according to the teachings of the present patent disclosure. It will be recognized by those skilled in the art upon reference hereto that although an embodiment of UE 102 may comprise an arrangement similar to one shown in FIG. 10, there can be a number of variations and modifications, in hardware, software or firmware, with respect to the various modules depicted. Accordingly, the arrangement of FIG. 10 should be taken as illustrative rather than limiting with respect to the embodiments of the present patent disclosure. A microprocessor 1002 providing for the overall control of an embodiment of UE 102 is operably coupled to a communication subsystem 1004 which includes transmitter/receiver (transceiver) functionality for effectuating multi-mode communications over a plurality of bands. By way of example, a wide area wireless Tx/Rx module 1006, a GAN Tx/Rx module 1008 and an I-WLAN Tx/Rx module 1010 are illustrated. Although not particularly shown, each Tx/Rx module may include other associated components such as one or more local oscillator (LO) modules, RF switches, RF bandpass filters, A/D and D/A converters, processing modules such as digital signal processors (DSPs), local memory, etc. As will be apparent to those skilled in the field of communications, the particular design of the communication subsystem 1004 may be dependent upon the communications networks with which the UE device is intended to operate. In one embodiment, the communication subsystem 1004 is operable with both voice and data communications.

Microprocessor 1002 also interfaces with further device subsystems such as auxiliary input/output (I/O) 1018, serial port 1020, display 1022, keyboard 1024, speaker 1026, microphone 1028, random access memory (RAM) 1030, a short-range communications subsystem 1032, and any other device subsystems generally labeled as reference numeral 1033. To control access, a SIM/RUIM interface 1034 is also provided in communication with the microprocessor 1002. In one implementation, SIM/RUIM interface 1034 is operable with a SIM/RUIM card having a number of key configurations 1044 and other information 1046 such as identification and subscriber-related data as well as one or more PLMN and SSID lists and filters alluded to hereinabove.

Operating system software and other control software may be embodied in a persistent storage module (i.e., non-volatile storage) such as Flash memory 1035. In one implementation, Flash memory 1035 may be segregated into different areas, e.g., storage area for computer programs 1036 as well as data storage regions such as device state 1037, address book 1039, other personal information manager (PIM) data 1041, and other data storage areas generally labeled as reference numeral 1043, wherein appropriate GANC or UNC information may be stored according to one implementation. Additionally, appropriate network discovery/selection logic 1040 may be provided as part of the persistent storage for executing the various procedures, correlation techniques, service/feature requirement selection and identification processes as well as GANC selection mechanisms set forth in the preceding sections. Associated therewith is a storage module 1038 for storing the SSID/PLMN lists, selection/scanning filters, capability indicators, et cetera, also alluded to hereinabove.

Based on the foregoing, it should be clear that the UE device logic and hardware includes at least the following: a logic module and/or associated means for gaining IP connectivity with respect to a wireless access network node disposed in a network environment that is comprised of a wireless AN space operable to be coupled to a WACN space; and a logic module and/or associated means for initiating a registration request message towards the wireless access network node, wherein the registration request message includes at least one information element pertaining to AN services required by the UE device.

It is believed that the operation and construction of the embodiments of the present patent disclosure will be apparent from the Detailed Description set forth above. While the exemplary embodiments shown and described may have been characterized as being preferred, it should be readily understood that various changes and modifications could be made therein without departing from the scope of the present invention as set forth in the following claims.

What is claimed is:

1. A network messaging method, comprising:
   gaining Internet Protocol (IP) connectivity by a user equipment (UE) device with respect to a wireless access network node disposed in a network environment that is comprised of a wireless access network (AN) space operable to be coupled to a wide area cellular network (WACN) space, wherein the WACN space includes one or more WACNs;
   sending a message by said UE device towards said wireless access network node, wherein said message includes location information associated with said UE device and at least one information element pertaining to AN services required by said UE device, wherein said message is initiated towards said wireless access network node after a successful discovery procedure or a failed registration with a serving access network node;
   receiving, at said UE device from said wireless access network node, a response message comprising a list of available WACNs based on the location information associated with said UE device and the AN services required by said UE;
   selecting, by said UE device, a WACN from the list of available WACNs; and
   storing a Fully Qualified Domain Name (FQDN) in said UE device, said FQDN for facilitating a Domain Name Query (DNS) with respect to an IP address of said wireless access network node.

2. The network messaging method as recited in claim 1, wherein said wireless access network node comprises a generic access network controller (GANC).

3. The network messaging method as recited in claim 2, wherein said GANC is a default GANC whose information is stored in said UE device.

4. The network messaging method as recited in claim 1, wherein said wireless access network node comprises an Unlicensed Mobile Access (UMA) network controller (UNC).

5. The network messaging method as recited in claim 4, wherein said UNC is a default UNC whose information is stored in said UE device.

6. The network messaging method as recited in claim 1, wherein the list of available WACNs is from the one or more WACNs of the WACN space coupled to said wireless access network node.

7. The network messaging method as recited in claim 1, wherein the message is a registration request message.

8. A user equipment (UE) device, comprising:
   a memory; and
   at least one hardware processor communicatively coupled with the memory and configured to:
     gain Internet Protocol (IP) connectivity with respect to a wireless access network node disposed in a network environment that is comprised of a wireless access network (AN) space operable to be coupled to a wide area cellular network (WACN) space, wherein the WACN space includes one or more WACNs;
     send a message towards said wireless access network node, wherein said message includes location information associated with said UE device and at least one information element pertaining to AN services required by said UE device, wherein said message is initiated towards said wireless access network node after a successful discovery procedure or a failed registration with a serving access network node;
     receive, at said UE device from said wireless access network node, a response message comprising a list of available WACNs based on the location information associated with said UE device and the AN services required by said UE;
     select, by said UE device, a WACN from the list of available WACNs; and
     store a Fully Qualified Domain Name (FQDN) in said UE device, said FQDN for facilitating a Domain Name Query (DNS) with respect to an IP address of said wireless access network node.

9. The UE device as recited in claim 8, wherein said wireless access network node comprises a generic access network controller (GANC).

10. The UE device as recited in claim 9, wherein said GANC is a default GANC whose information is stored in said UE device.

11. The UE device as recited as recited in claim 8, wherein said wireless access network node comprises an Unlicensed Mobile Access (UMA) network controller (UNC).

12. The UE device as recited in claim 9, wherein said UNC is a default UNC whose information is stored in said UE device.

13. The UE device as recited in claim 8, wherein the list of available WACNs is from the one or more WACNs of the WACN space coupled to said wireless access network node.

14. The UE device as recited in claim 8, wherein the message is a registration request message.

15. The UE device as recited in claim 8, further includes a storage device that stores an IP address in said UE device, said IP address for identifying said wireless access network node.

16. A network system, comprising:
a wireless access network node disposed in a network environment that is comprised of a wireless access network (AN) space operable to be coupled to a wide area cellular network (WACN) space, wherein the WACN space includes one or more WACNs; and
a user equipment (UE) device configured to:
gain Internet Protocol (IP) connectivity with said wireless access network node;
send a message towards said wireless access network node, wherein said message includes location information associated with said UE device and at least one information element pertaining to wireless access services required by said UE device, wherein said message is initiated towards said wireless access network node after a successful discovery procedure or a failed registration with a serving access network node;
receive, from said wireless access network node, a response message comprising a list of available WACNs based on the location information associated with said UE device and the AN services required by said UE;
select a WACN from the list of available WACNs; and
store a Fully Qualified Domain Name (FQDN) in said UE device, said FQDN for facilitating a Domain Name Query (DNS) with respect to an IP address of said wireless access network node.

17. The network system as recited in claim 16, wherein the list of available WACNs is from the one or more WACNs of the WACN space coupled to said wireless access network node.

18. The network system as recited in claim 16, wherein said wireless access network node comprises a generic access network controller (GANC).

19. The network system as recited in claim 18, wherein said GANC is a default GANC whose information is stored in said UE device.

20. The network system as recited in claim 16, wherein said wireless access network node comprises an Unlicensed Mobile Access (UMA) network controller (UNC).

* * * * *